US010749852B2

(12) United States Patent
Thomas

(10) Patent No.: US 10,749,852 B2
(45) Date of Patent: Aug. 18, 2020

(54) SYSTEMS AND METHODS FOR CONNECTING PRIVATE DEVICES TO PUBLIC DEVICES ACCORDING TO CONNECTION PARAMETERS

(71) Applicant: Rovi Guides, Inc., San Jose, CA (US)

(72) Inventor: William L. Thomas, Evergreen, CO (US)

(73) Assignee: Rovi Guides, Inc., San Jose, CA (US)

( * ) Notice: Subject to any disclaimer, the term of this patent is extended or adjusted under 35 U.S.C. 154(b) by 281 days.

(21) Appl. No.: 15/976,435

(22) Filed: May 10, 2018

(65) Prior Publication Data
US 2019/0349344 A1 Nov. 14, 2019

(51) Int. Cl.
*H04L 29/06* (2006.01)
*H04L 29/08* (2006.01)

(52) U.S. Cl.
CPC .......... *H04L 63/08* (2013.01); *H04L 63/0435* (2013.01); *H04L 63/10* (2013.01); *H04L 65/1066* (2013.01); *H04L 67/303* (2013.01); *H04L 67/306* (2013.01)

(58) Field of Classification Search
CPC ..... H04L 63/08; H04L 63/0435; H04L 63/10; H04L 65/1066; H04L 67/303; H04L 67/306
See application file for complete search history.

(56) References Cited

U.S. PATENT DOCUMENTS

| 7,165,098 | B1 | 1/2007 | Boyer et al. |
| 7,761,892 | B2 | 7/2010 | Ellis et al. |
| 8,026,805 | B1 * | 9/2011 | Rowe ............... H04N 21/43615 340/539.1 |
| 8,046,801 | B2 | 10/2011 | Ellis et al. |
| 9,112,849 | B1 | 8/2015 | Ahlin et al. |
| 2002/0174430 | A1 | 11/2002 | Ellis et al. |
| 2005/0251827 | A1 | 11/2005 | Ellis et al. |

(Continued)

OTHER PUBLICATIONS

International Search Report and Written Opinion of PCT/US2019/030622 dated Sep. 11, 2019.

(Continued)

*Primary Examiner* — Shahriar Zarrineh
(74) *Attorney, Agent, or Firm* — Haley Guiliano LLP

(57) ABSTRACT

Systems and methods for connecting a private device to a public device based on various connection parameters. For example, a media guidance application may receive a communication requesting to use the public device from a private device that is implementing a private interface application (e.g., Netflix™ a streaming media application). In response, the media guidance application may generate an authorization key that is unique to the private device and comprises connection parameters. The media guidance application may transmit the authorization key to the private interface application to initiate a session between the public device and the private device. Whenever a command is received from the private device, the media guidance application may verify the authorization key and determine whether the connection parameters are satisfied. In response to verifying the authorization key and the connection parameters, the public device may execute the received command.

20 Claims, 14 Drawing Sheets

(56) References Cited

U.S. PATENT DOCUMENTS

| | | | |
|---|---|---|---|
| 2010/0136952 A1 | 6/2010 | Rofougaran | |
| 2013/0083059 A1* | 4/2013 | Hwang | G06F 11/323 |
| | | | 345/629 |
| 2013/0143651 A1* | 6/2013 | Harrison | H04L 63/107 |
| | | | 463/31 |
| 2013/0304817 A1 | 11/2013 | Hu et al. | |
| 2014/0053182 A1 | 2/2014 | Jääger et al. | |
| 2014/0280543 A1* | 9/2014 | Murphy | H04L 51/20 |
| | | | 709/204 |
| 2014/0364056 A1* | 12/2014 | Belk | H04B 5/0031 |
| | | | 455/41.1 |
| 2016/0105761 A1* | 4/2016 | Polo | H04W 56/001 |
| | | | 455/41.2 |
| 2016/0149891 A1* | 5/2016 | Kuper | H04N 21/25875 |
| | | | 726/9 |
| 2017/0135113 A1* | 5/2017 | Vanscoyk | H04W 4/025 |
| 2019/0349379 A1* | 11/2019 | Thomas | H04N 21/2393 |
| 2019/0349380 A1* | 11/2019 | Thomas | G02F 1/13 |
| 2019/0349381 A1* | 11/2019 | Thomas | H04L 63/062 |
| 2019/0349382 A1* | 11/2019 | Thomas | H04N 21/43637 |

OTHER PUBLICATIONS

International Search Report and Written Opinion of PCT/US2019/029886 dated Jul. 10, 2019.

* cited by examiner

SYSTEMS AND METHODS FOR CONNECTING PRIVATE DEVICES TO PUBLIC DEVICES ACCORDING TO CONNECTION PARAMETERS

BACKGROUND

The rapid development of technology has led to the rise of the Internet of Things, which allows users to connect, via the Internet, their devices with other devices in order to send commands, share content, access media, etc. However, the connection process between a user's device and another device may not be seamless, immediate, or satisfying.

SUMMARY

A user may connect a personal device, which may be readily available (e.g., a smartphone), to a secondary device (e.g., a smart speaker) in order to do a variety of things. In situations where the user is not the owner of the other device (e.g., a public device), the connection process can be cumbersome. For example, the user may not seamlessly be able to connect to the secondary device. While traditional computer processors may receive/transmit connection requests, these systems still fail to solve the aforementioned problem when implemented in computer systems as they fail to account for the issues created when a user is attempting to connect to a public device, namely: (i) the device the user is attempting to connect to is incompatible with the user's media device; (ii) the device may not be detectable to the user's media device; (iii) the connection process may require an amount of processing that the user's device/the secondary device cannot sustain/withstand; (iv) the device the user is attempting to connect to does not have the proper applications to access the media content because it is not previously configured by the user; (v) the devices have poor connectivity; and/or (vi) the connection poses security risks. Conventional solutions to these problems rely on the use of dongles inserted into the secondary device or require the secondary device to have particular hardware, or pre-installed software, compatible with hardware or software of a user's device. Thus, these conventional solutions require the user to have access to the secondary device (e.g., to insert a dongle) and/or are limited to secondary devices with a particular hardware and/or software configuration.

Accordingly, to overcome the problems in computer systems when connecting a private device to a public device, systems and methods are described herein for a media guidance application that identifies public devices, bridges the communication between the private device of the user and the public device, and connects the respective devices without requiring the user to have access to the secondary device (e.g., to insert a dongle) and/or requiring the secondary devices to have a particular hardware and/or software configuration. These solutions are provided for through the use of specialized authorization keys.

For example, a user may wish to connect his/her smartphone to a public display in a mall. A media guidance application, installed on the user's smartphone or on an external server, may communicate with the public display, requesting to connect the public display with the user's smartphone. In response to receiving the request to connect and authenticating the user's credentials (e.g., to retrieve information/content if necessary), the public display may generate an authorization key that enables communication between the user's smartphone and the public display and may transmit the authorization key to the user's smartphone. Specifically, the authorization key may consist of connection parameters (e.g., information about minimum data transfer rates, time limits, predetermined proximity requirements, etc.) to ensure a secure, stable, and easy-to-initiate connection. These connection parameters, selected based on the situation or the desire connection goal, provide the aforementioned solutions. For example, the user's smartphone may accordingly be able to send commands (e.g., generate for display content, browse the Internet, communicate with an external device, etc.) in conjunction with the authorization key, to the public display. The media guidance application may moderate the connection between the respective devices by validating the authorization key when a command is received at the public device. In response to determining that the authorization key is valid, the public device may execute the command (e.g., display a requested media asset).

In some aspects, a media guidance application may receive a communication from a private device, implementing a private interface application, indicating that a user wishes to use a public device. The private device may be any electronic device that the user has access to and/or owns, and that is capable of communicating with other devices. The public device may be any electronic device that is available for access by several users and is capable of communicating with other devices. Examples of private and public devices include, but are not limited to, displays, smartphones, smartwatches, smart speakers, computers, biometric devices, video game consoles, etc. The communication received from the private device may be in the form of a communication protocol data unit (e.g., a packet, a frame, a cell, etc.) in which the destination of the data unit is the communication address of the public device.

In some embodiments, the communication from the private device is transmitted to the public device in response to receiving, at the private device, a broadcast message inviting the private device to access the public device. In some embodiments, the broadcast message inviting the private device to access the public device is transmitted by the public device, in response to determining that the private device is within a predetermined displacement from the public device. For example, the public device may broadcast discovery messages in order to detect devices. In response, the public device may receive acknowledgment responses with received signal strength indicator (RSSI) values from the devices that received the discovery message. The media guidance application may determine, using a lookup table which returns distance as a function of RSSI, the distance between the public device and the acknowledging device. In response to determining that the distance is within a predetermined displacement from the public device, the media guidance application of the public device may transmit the message inviting the acknowledging device (e.g., the user's private device) to access the public device. In some embodiments, the distance between the public and private device may be determined using the difference of their respective GPS coordinates, using NFC technology.

For example, if the private device is the user's smartphone, on which the media guidance application is installed, the private interface application (e.g., the YouTube mobile app, the Spotify app, etc.) may be either stored or actively running on the private device. The user may specifically wish to transmit, from the private device to the public device, a command that is associated with the private interface application. In some embodiments, the media guidance application may display information about all public devices available for access in the vicinity of the private device. For example, the media guidance application may provide a map/list of the public devices nearby and may allow the user to select a public device in order to send a request to connect. It should be noted that the media guidance application may be installed on a remote server, instead of the user's device. Accordingly, the remote server may communicate with the private device in order to provide the list/map of accessible public devices in the user's vicinity. Furthermore, the media guidance application may be integrated with the private interface application. Thus, the user may be able to view the map/list from the private interface application directly. In another example, if the public device is a large touchscreen display located in a mall, the public display may receive the user's request to connect from the user's smartphone. The communication between the private device and the public device may be implemented over various communication infrastructures including, but not limited to, Wi-Fi, Bluetooth, cellular networks, wired connections (e.g., Ethernet), etc. Various servers, routers, switches, hubs, etc., may serve as intermediate devices configured to pass data between the public device and the private device.

In some embodiments, the public device and the private device may not be compatible. For example, the public device may be a public display with a Windows™-based operating system and the private device may be a smartphone with an iOS™-based operating system. In some cases, the two respective devices may be unable to communicate due to their differences in programming. As a result, the media guidance application may determine that the private device is of a first operating system type and the public device is of a second operating system type. The media guidance application may determine that the first operating system type is incompatible with the second operating system type. In response to receiving a first message (e.g., command, request, data packet) that is encoded using the first operating system type by the private interface application and is to be sent to the public device, the media guidance application may translate the content of the first message and generate a second message encoded using the second operating system type that includes the content of the first message. The media guidance application may then record the first message in a log and may transmit the second message to the public device.

The media guidance application may request, from the private device, both user authorization information and an identifier for the private interface application. In response to the user making a selection of the public device, the media guidance application may create a temporary connection between the private device and the public device. The temporary connection may allow the private device and the public device to communicate without providing access to the functionality of either device (e.g., the ability to access and display the content). Accordingly, the private device may receive, from either the public device or a remote server with the media guidance application, a request for user authorization information and an identifier of the private interface application. The user authorization information may comprise data required to verify the user's identity with the content provider. For example, the user authorization information may list the subscriptions the user possesses and the respective login keys (e.g., username, password, security questions, PIN codes, etc.) to access the subscriptions. The identifier of the private interface application may be any descriptive attribute of the private interface application including, but not limited to, a name, a logo, a developer name, software details (e.g., build number, version, compatible operating system), a screenshot of the user interface, etc. It should be noted that the identifier may comprise a combination of descriptive attributes. For example, an identifier may include the name of a content provider (e.g., Netflix™) associated with the private interface application, the version of the private interface application (e.g., version 5.6), and the compatible operating systems (e.g., iOS™, Android™). Thus, in this example, the identifier that the private device may provide to the public device is "Netflix™, Android™ application version 5.6." It should be noted that the content provider may be a third-party source (e.g., Google™ Play Store, App Store) as well.

In some embodiments, the user authorization information may be stored on a server. The public device may scan the user's face and/or fingerprint and run facial/fingerprint recognition analysis using a facial/fingerprint database that may be stored on the server. In response to identifying a match, the media guidance application may retrieve the user authorization information associated with the match.

The media guidance application may then generate, at the public device, an authorization key unique to the private device based on (i) the user authorization information, (ii) the identifier and (iii) connection parameters, wherein the authorization key is required to cause the public device to execute commands received from the private device during a session. Continuing from the previous example, suppose that the identifier for the private interface application is "Netflix™, Android™ application version 5.6." The user authorization information may thus comprise a username and password to the user's Netflix™ account. The connection parameters represent conditions that must be met in order to maintain the connection between the public device and the private device. For example, the connection parameters may comprise a predetermined proximity to the public device, within which the private device must remain in order for the authorization key to remain valid. The connection parameters may comprise restrictions on certain commands that the user may request. For example, the user may request that the public device perform a task that demands heavy processing as it requires high-end graphics (e.g., the command may be to generate for display a video game). In this example, the public device cannot generate for display the video game because the requirements of the video game exceed the public device's technical capabilities. For example, the public device may have limitations in CPU processing power, memory, graphics (e.g., resolution), or connectivity (e.g., network bandwidth). In the absence of connection parameters, the public device may get damaged while trying to generate for display the video game (e.g., may cause corrupted files and/or overheating at the motherboard).

Accordingly, the media guidance application may take the public device's technical capabilities into consideration and limit the user to commands that the public device can implement, information about which may be included in the connection parameters. Similarly, the connection parameters may include information such as the connection type (e.g., Wi-Fi, cellular data, etc.) established between the private device and public device, the location of the respective devices, time limits for accessing the public device (e.g., allow the connection between the public device and the private device for one hour only), etc. The authorization key may be encrypted by symmetric and/or public/private encryption method. This provides security and prevents other devices from sending commands on behalf of the private device. An example of an authorization key may be "AUTH:username-password_ID:identifier_PARA:parameters." Therefore, if the username of a user is "user123," the password is "pass123," the identifier is "Netflix™, Android™ application version 5.6," and the connection parameters include a predetermined proximity, the private device serial number, public device serial number, connection type, minimum data transfer rate, and time limit (e.g., 5m-private123-public321-bluetooth-100 kbps-60 min), the authorization key in its entirety may be "AUTH:user123-pass123_ID:Netflix™[Android™, v5.6]_PARA:5m-private123-public321-bluetooth-100 kbps-60 min."

In some embodiments, the user may not need to provide user authorization information because the user may be interested in accessing a publicly accessible application on the public device. For example, if the user possesses a cellphone that does not have smartphone features, the user may wish to read the news, look up the weather, or browse the Internet. Accordingly, the user may not be able to perform those tasks on the private device and also does not need authorization information to pull up the user's profile (e.g., Netflix™ account with preferences). Thus, when the media guidance application requests user authorization information, the user may not provide user authorization information. In response, the media guidance application may not include user authorization information in the authorization key (e.g., leave the text after "AUTH" empty).

The media guidance application may then transmit, to the private device, the authorization key and in response to transmitting the authorization key, the media guidance application may initiate a session, at the public device, with the private device. The session may be a formal connection between the public device and the private device in which commands can be exchanged between the respective devices. The formal connection may be established over various communication infrastructures including, but not limited to, Wi-Fi, Bluetooth, cellular networks, wired connections (e.g., Ethernet), etc. It should be noted that the authorization key is required to execute commands, at the public device, received from the private device during the session.

The media guidance application may then receive, at the public device, a first communication from the private interface application. The media guidance application may parse, at the public device, the first communication to identify the authorization key and a command to execute on the public device. The command is a task that the user assigns to the public device. Furthermore, the command may be associated specifically with the private interface application. For example, if the private interface application is a video streaming application such as the Netflix™ mobile app, the user may initiate a first communication with the public device by sending a command that requests that the public device download a public interface application (e.g., a corresponding Netflix™ application) that is compatible with the private interface application. The command may also be to change a setting of the public device (e.g., increase volume, decrease brightness, etc.). The commands may be transmitted as text from the private device to the public device, verbally from the user to the public device, via gestures or any visual indication of a command from the user/private device to the public device, or biometric changes (e.g., changes in heart rate, tightening of muscles, etc.). It should be noted that not all public devices may have displays (e.g., smart speakers, augmented reality devices, hologram generators, etc.). For those particular public devices, an appropriate user interface that is compatible with the public device and allows user interaction via the private interface application may be used. Based on the examples listed above, these substitute user interfaces may be an audio user interface (e.g., where a menu is read aloud to the user), augmented reality user interface (e.g., allows the user to see an augmented reality screen via the private device), or a holographic projection user interface (e.g., where the menu is projected). In some embodiments, the private interface application and/or the public interface application may be browser-based (e.g., implemented in HTML5).

The media guidance application may then validate, at the public device, the authorization key. Validating the authorization key may involve two steps: (1) determining whether the authorization key received from the private device matches the authorization key transmitted by the public device to the private device and (2) determining whether the connection parameters are satisfied. For example, the media guidance application may store a copy of the authorization key for a threshold time (e.g., three minutes) when transmitting the authorization key to the private device. Thus, the private device must send a command within the threshold time before the media guidance application erases the authorization key from the memory of the public device. In response to receiving a command (e.g., as a first communication), the media guidance application may decrypt the authorization key at the public device and determine whether the received authorization key matches the authorization key in the memory of the public device. If the respective authorization keys match, the media guidance application may determine whether the connection parameters of the authorization key are satisfied (e.g., whether the connection type is the same, the data transfer rate is locked to a threshold speed, the private device is within the predetermined proximity, the time elapsed within the time limit, etc.). If the received authorization key matches and each connection parameter is satisfied, the media guidance application may validate the authorization key. In response to validating the authorization key, the media guidance application may execute, at the public device, the command. For example, the command may be to generate for display, on the public device, a media asset selected on the private interface application (e.g., a movie selected on the Netflix™ mobile application).

In some embodiments, the authorization key may be different for each communication exchanged between the public device and the private device (e.g., in order to improve security). For example, the authorization key may additionally comprise a timestamp in order to allow the media guidance application to determine the order at which communications were received and also to distinguish each private device that may be sending communications to the public device (e.g., when multiple private devices are connected to the public device). In response to the initiation of a session between the public device and the private device, the media guidance application of the private device may begin sending commands from the private interface application to the public device. The authorization key previously sent by the public device may accompany the command from the private device. In response to receiving the command and the authorization key, the media guidance application may parse the authorization key to determine whether it matches the authorization key generated at the public device. In response to determining a match, the media guidance application of the public device may execute the command sent by the private interface application. In response to determining that the authorization key does not match, the media guidance application of the public device may end the session. Furthermore, the media guidance application of the public device may generate a new authorization key and transmit the new authorization key to the private device, in response to receiving a command from the private interface application that is accompanied by an authorization key that matches the authorization previously transmitted by the public device.

In some embodiments, the connection parameters may comprise a predetermined proximity to the public device within which the private device must remain in order for the authorization key to remain valid (e.g., in order to prevent a user from connecting to a device to which he/she cannot view or use). The predetermined proximity may be a physical distance/displacement that represents the furthest point the private device can be from the public device in a particular direction. For simplicity, the predetermined proximity may be interpreted as a connection "sphere" of a certain radius (e.g., five meters). Accordingly, the private device may be up to five meters from the public device in any direction in order for the private interface application to communicate with the public interface application. Due to the presence of obstacles (e.g., walls, objects, etc.), the predetermined proximity may not be the same in all directions. For example, the predetermined proximity perpendicular to the display of the public device and parallel to the floor may be five meters. However, the predetermined proximity perpendicular to the floor and the display of the public device (e.g., pointing upwards) may be three meters due to the presence of a ceiling (e.g., the ceiling may significantly reduce the signal strength). The public device may further generate, for display/audio, the predetermined proximity for the user on the public device.

The media guidance application may generate, at the public device, the authorization key by retrieving a device identifier of the private device (e.g., in order to precisely identify the user and/or data associated with the user). The device identifier may be a descriptive attribute of the private device such as at least one of the device name, device type, model number, serial number, manufacturer name, battery life, etc. Multiple descriptive attributes may make up a device identifier. For example, if the private device's manufacturer is Google, the name of the device is Pixel XL, the model number is 2, and the serial number is 12345, the device identifier may be "Google Pixel XL 2, 12345."

The media guidance application may then determine a connection strength between the private device and the public device (e.g., in order to ensure the quality of the connection). The connection strength may be a quantitative or qualitative value that represents the quality of the connection between two or more devices. The connection strength may be described using data transfer rates (e.g., download/upload speeds) or signal power. For example, if the connection strength is a quantitative value, the media guidance application may transmit a test message from the private device to the public device and measure, at the public device, the download transfer rate (e.g., megabytes per second). The media guidance application may then send a test message from the public device to the private device, and may measure, at the private device, the download transfer rate. It should be noted that the transfer rates at the public device and the private device are with respect to each other only. For example, the private device may have a general download transfer rate when connected to a different device, and the general download transfer rate may be different from the transfer rate with the public device. In response to determining the respective download transfer rates at each respective device, the media guidance application may determine the average download transfer rate between the respective devices. The average download transfer rate (e.g., 5 Mbps) may represent the connection strength. A similar procedure may be used by the media guidance application to determine the average upload transfer rate, which may also be used to represent the connection strength. In some embodiments, the media guidance application may determine the connection strength by determining that average transfer rate by averaging the average download transfer rate and the average upload transfer rate. In some embodiments, the connection strength may be represented by the lowest transfer rate between the respective devices. For example, if the upload transfer rates of the private device and the public device are 2 Mbps and 3 Mbps, respectively, and the download transfer rates are 10 Mbps and 15 Mbps, respectively, the connection strength may be represented as 2 Mbps.

When the connection strength is represented qualitatively, the media guidance application may determine the quantitative value of the signal strength/transfer rate and refer to data structure that converts the quantitative value to a qualitative value. For example, the data in the data structure may be predetermined by the media guidance application. Furthermore, each quantitative range may represent a qualitative value. In this example, there may be five qualitative classifications of the connection strength: poor, below average, average, above average, and strong. In terms of transfer rates, the respective transfer rate ranges for each classification may be 0-0.5 Mbps, 0.5-1 Mbps, 1 Mbps-3 Mbps, 3 Mbps-5 Mbps, and 5+ Mbps. In terms of signal power, the respective signal power ranges may be −113-−100 dBm, −100-−80 dBm, etc.

The media guidance application may then determine the predetermined proximity, based on the device identifier and the connection strength (e.g., to ensure that a connection is maintained between the respective devices). For example, the media guidance application may retrieve, using the device identifier, additional information about the private device. The additional information may include technical details about the private device such as compatible connection types (e.g., Bluetooth, cellular, Wi-Fi, etc.) and processing capabilities (e.g., from a processor chip specification). Using this information, alongside the connection strength, the media guidance application may determine a maximum distance that the private device can be from the public device without dropping the connection strength or causing the private device to exhaust processing.

In some embodiments, the media guidance application may receive, at the public device, a received signal strength indicator (RSSI) from the private device. The media guidance application may set the RSSI value as the connection strength. An RSSI represents the power of a received signal. The media guidance application may then approximate a distance between the public device and the private device. For example, the media guidance application may determine that the RSSI of the original transmitted signal is 0 and the RSSI received at the private device is −20. The media guidance application may determine, using a lookup table that returns distance as a function of RSSI, the distance between the private device and the public device.

The user authorization information may comprise a user profile. Accordingly, the media guidance application may also determine an application usage history based on the user profile. For example, the application usage history may list all of the applications the user has accessed in a period of time. Alongside listing the application name, the application usage history may track the amount of time the user spent accessing an application, and the number of times the user has accessed the application. The media guidance application may then determine an anticipated processing ratio between the private device and the public device, based on the application usage history and the device identifier. The purpose of determining an anticipated processing ratio between the respective devices is to balance the processing requirements between the public device and the private device. For example, the private and public devices may be capable of load-sharing processing. Suppose that multiple private devices are connected to the public device. In order to ensure that a user's command is executed at the public device, the public device may reserve a certain amount of processing power for the user and assign additional processing to the private device.

In some embodiments, determining the anticipated processing ratio between the private device and the public device further comprises the media guidance application determining a first processing limit of the private device based on the device identifier and a second processing limit of the public device. For example, the device identifier of the private device may be "Google Pixel XL 2." The media guidance application may retrieve additional information about the private device using the Internet. Specifically, the media guidance application may determine that the private device is a smartphone with a Qualcomm Snapdragon 835 processing chip and 4 gigabytes of RAM. Based on the additional information retrieved using the device identifier, the media guidance application may set the first processing limit to 4 GB RAM at 2.35 GHz. In this example, the technical capabilities of the public device are 8 GB RAM at 2.5 GHz (e.g., which may be set as the second processing limit). The media guidance application may determine an average processing requirement associated with at least one application in the application usage history. For example, the media guidance application may select the private interface application as the at least one application in the application usage history and retrieve metadata associated with the private interface application. The metadata may list the average processing requirement of the private interface application. For example, the average processing requirement of the Netflix™ mobile application may be 512 MB RAM at 1.8 GHz. In some embodiments, the media guidance application may determine the likelihood of the user accessing an application listed in the application usage history. For example, the media guidance application may use a probability model as a function of frequency of usage, total amount of times accessed, and the time length of each access, in order to determine the likelihood of the user accessing an application. The media guidance application may then select the application with the highest likelihood and determine its average processing requirement. In some embodiments, the media guidance application may determine the average processing requirement by averaging the processing requirements of all applications listed in the application usage history. In some embodiments, the media guidance application may identify the application with the highest processing requirement and set the respective processing requirement as the average processing requirement.

Furthermore, the media guidance application may identify power consumption information of the private device based on the device identifier. For example, the additional information retrieved by the media guidance application based on the device identifier, may include the maximum battery capacity of the private device. For example, the battery capacity of the private device may be 3,520 mAh. In this example, the device identifier lists the battery life of the private device as 80% battery remaining. The media guidance application may determine that the power consumption information indicates a remaining battery of 80% of 3,520 mAh (i.e., 2816 mAh). In addition, the power consumption information may indicate the amount of time the remaining battery can be used when the private device is functioning at a specific processing scheme. For example, the power consumption information may indicate the private device's battery will remain charged (e.g., above 0%) for 0.5 hours when utilizing 3 GB RAM and 1.5 GHz of processing.

The media guidance application may thus determine a first anticipated processing load for the private device, based on the power consumption information and the first processing limit (e.g., to balance the processing requirements for executing a command). Additionally, the media guidance application may determine a second anticipated processing load for the public device, wherein a sum of the first anticipated processing load and the second anticipated processing load is greater than or equal to the average processing requirement. For example, the private interface application is the Netflix™ mobile application and the user will send commands based on the Netflix™ mobile application (e.g., mirroring the application, downloading a public interface application associated with the private interface application, etc.). The average processing requirement for the private interface application and/or the public interface application of Netflix™ may have an average processing requirement of 512 MB RAM at 1.8 GHz. The media guidance application may allocate 256 MB RAM and 1.8 GHz of the second processing limit for the public device. Similarly, the media guidance application may allocate 256 MB RAM and 1.8 GHz of the first processing limit for the private device. This may ensure that anticipated commands from the user are executed. It should be noted that the sum of the respective anticipated processing loads equals the average processing requirement. In some embodiments, the media guidance application may allocate the entire average processing requirement as the second anticipated processing load. This minimizes the processing that must be performed at the private device and reduces the amount of communication that must be carried out between the public device and the private device. In conditions where the average processing requirement is less than the second processing limit, the media guidance application may treat the public device as a thick client for heavy processing duties and may treat the private device as a thin client for sending basic communications (e.g., exchanging commands and processing status information).

In some embodiments, the media guidance application may determine that a second private device is connected with the public device (e.g., in order to allow multiple private devices to share a public device). Accordingly, the second processing limit of the public device may be lower than the maximum processing capabilities of the public device because the media guidance application may previously have allocated a third anticipated processing load for the public device. Therefore, the media guidance application may determine the second anticipated processing load based on the remaining processing capabilities of the public device and allocate the rest to the first private device as the first anticipated processing load.

The media guidance application may then determine the anticipated processing ratio between the private device and the public device, based on the first anticipated processing load and the second anticipated processing load. For example, the media guidance application may determine a percentage of the average processing requirement that was allocated to the public device and a percentage that was allocated to the private device. In the previous example, both devices were allocated an equal anticipated processing load (e.g., 50% each). The anticipated processing ratio of the private device to the public device is therefore 50:50 (i.e., 1:1). In another example, the percentage for the public device is 70% and the percentage for the private device is 30%. The anticipated processing ratio would thus be 30:70 (i.e., 3:7). In some embodiments, the anticipated processing ratio may be of the public device to the private device (e.g., 70:30).

In terms of determining the predetermined proximity, the media guidance application may then determine a radial displacement between the private device and the public device, wherein when the private device is a distance, less than or equal to the radial displacement, from the public device, (i) the connection strength does not decrease by more than a degradation threshold and (ii) the anticipated processing ratio does not increase by more than a processing limit threshold. For example, the distance, between the private device and the public device at which the connection strength (e.g., "good") is determined, may be three meters. The media guidance application may determine a radial displacement representing the farthest the private device can be from the public device without reducing the connection strength by a degradation threshold. The degradation threshold may be an amount (e.g., percentage, fraction, value) of the connection strength that represents a significant change in the quality of a connection. For example, the media guidance application may determine a radius of 6 meters. The radius may indicate that the private device can be up to 6 meters away from the public device, without reducing the connection strength (e.g., to "above average"). Furthermore, the media guidance application may determine that as the private device moves farther away from the public device, the public device and/or the private device may expend more processing in communicating with one another. For example, the user may have issued a command to the public device to retrieve a video game and generate for display. As the private device moves farther away from the public device, or behind obstacles, the media guidance application may attempt to reduce the processing load of the public device and allocate more processing on the private device (e.g., to ensure that the user has immediate access to the video game or to reduce the latency between the user issuing a command and the command's execution at the public device). The change in processing loads may thus change the processing ratio. For example, the processing ratio between the private device and the public device may be 50:50. However, due to the increase in distance between the private device and public device (e.g., beyond the radial displacement), the connection strength may decrease and the processing ratio may become 70:30 (e.g., increase processing at the private device to make up for the degradation in the connection strength). The processing limit threshold may be a maximum change in processing loads before the connection between the public device and the private device may become unstable. The processing limit may be the difference between the first processing limit and the processing load of the private device. For example, if an increase in the processing load of the private device is equal to the processing limit of the private device, the media guidance application may determine that the connection is unstable and may end the session. Similarly, if the increase in the processing load of the public device is equal to the processing limit of the public device, the media guidance application may determine that the connection is unstable and may end the session.

Thus, the media guidance application may determine the predetermined proximity based on the radial displacement. For example, if the radial displacement is 6 meters from the public device, the media guidance application may determine a buffer distance beyond the radial displacement in which the connection strength between the private device and the public device reduces beyond a connection strength threshold (e.g., 50% degradation from the originally determined connection strength). The predetermined proximity may represent a sum of the radial displacement, and the buffer distance. In some embodiments, the media guidance application may generate for display the connection strength, the radial displacement, and/or the predetermined proximity on the public device and/or private device, for the user. Similarly, the media guidance application may also generate for display the connection parameters of the connection on the public device and/or private device.

In some embodiments, wherein the connection parameters comprise a predetermined proximity to the public device within which the private device must remain in order for the authorization key to remain valid, the media guidance application may verify that the private device is within the predetermined proximity to the public device. For example, the media guidance application may request RSSI values (e.g., imbed an RSSI value to the authorization key) from the private device and convert the RSSI values to distances based on the lookup table previously discussed. The media guidance application may then determine whether the converted distance (e.g., 3 meters) is greater than the predetermined proximity (e.g., 5 meters). In response to validating the authorization key (e.g., determining a match as previously discussed) and verifying that the private device is within the predetermined proximity to the public device, the media guidance application may execute, at the public device, the command. In some embodiments, the media guidance application may invalidate, at the public device, the authorization key, by determining that the private device is outside the predetermined proximity to the public device. For example, if the distance between the private device and the public device is determined to be 7 meters and the predetermined proximity is 5 meters, the media guidance application may no longer accept the authorization key. Instead, the media guidance application may mark the authorization key as invalid to prevent further communication using the authorization key. In response to invalidating the authorization key, the media guidance application may also end the session between the public device and the private device.

In some embodiments, the user authorization information is a universally unique identifier (UUID) or globally unique identifier (GUID) generated by the private interface application in response to verifying a login name and password entered into the private interface application, and wherein the user authorization information is valid for a predetermined time after verifying the login name and password. For example, the user authorization may be an identifier that represents the user's login name and password. Accordingly, the actual values of the login name and password are not exposed to the public device. Instead, the media guidance application assigns a UUID or a GUID associated with the user in response to verifying the user's login name/username and password. For example, the predetermined time may be one hour. Thus, the UUID and GUID may become invalid after one hour. The media guidance application may then re-verify the user's login name and password.

In some embodiments, the public device may be configured to automatically remove the user authorization information from memory on the public device upon deactivation (e.g., ending the session) of the public interface application on the public device. Additionally, the private interface application may be configured to retain the user authorization information in memory on the private device upon deactivation of the private interface application on the private device. For example, the media guidance application may remove the user authorization information from the public device to prevent other users from accessing the user's content. As mentioned previously, the user authorization information may be in the form of a UUID or a GUID. Accordingly, the media guidance application may store the user authorization information on the public device. If the predetermined time in which the UUID/GUID is valid is five days, the media guidance application may seamlessly connect the public device and the private device without the need for verifying the user's login name and password for the content provider within the five days.

It should be noted that the systems, methods, apparatuses, and/or aspects described above may be applied to, or used in accordance with, other systems, methods, apparatuses, and/or aspects described in this disclosure.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for connecting public devices to private devices in order to receive and execute user commands. For example, a user may wish to connect his/her smartphone to a public display in a mall. A media guidance application, installed on the user's smartphone or on an external server, may communicate with the public display, requesting to connect the public display with the user's smartphone. In response to receiving the request to connect and authenticating the user's credentials (e.g., to retrieve information/content if necessary), the public display may generate an authorization key that enables communication between the user's smartphone and the public display and may transmit the authorization key to the user's smartphone. Specifically, the authorization key may consist of connection parameters (e.g., information about minimum data transfer rates, time limits, predetermined proximity requirements, etc.) to ensure a secure, stable, and easy-to-initiate connection. The user's smartphone may accordingly be able to send commands (e.g., generate for display content, browse the Internet, communicate with an external device, etc.) in conjunction with the authorization key, to the public display. The media guidance application may moderate the connection between the respective devices by validating the authorization key when a command is received at the public device. In response to determining that the authorization key is valid, the public device may execute the command (e.g., display a requested media asset).

Figure 1:
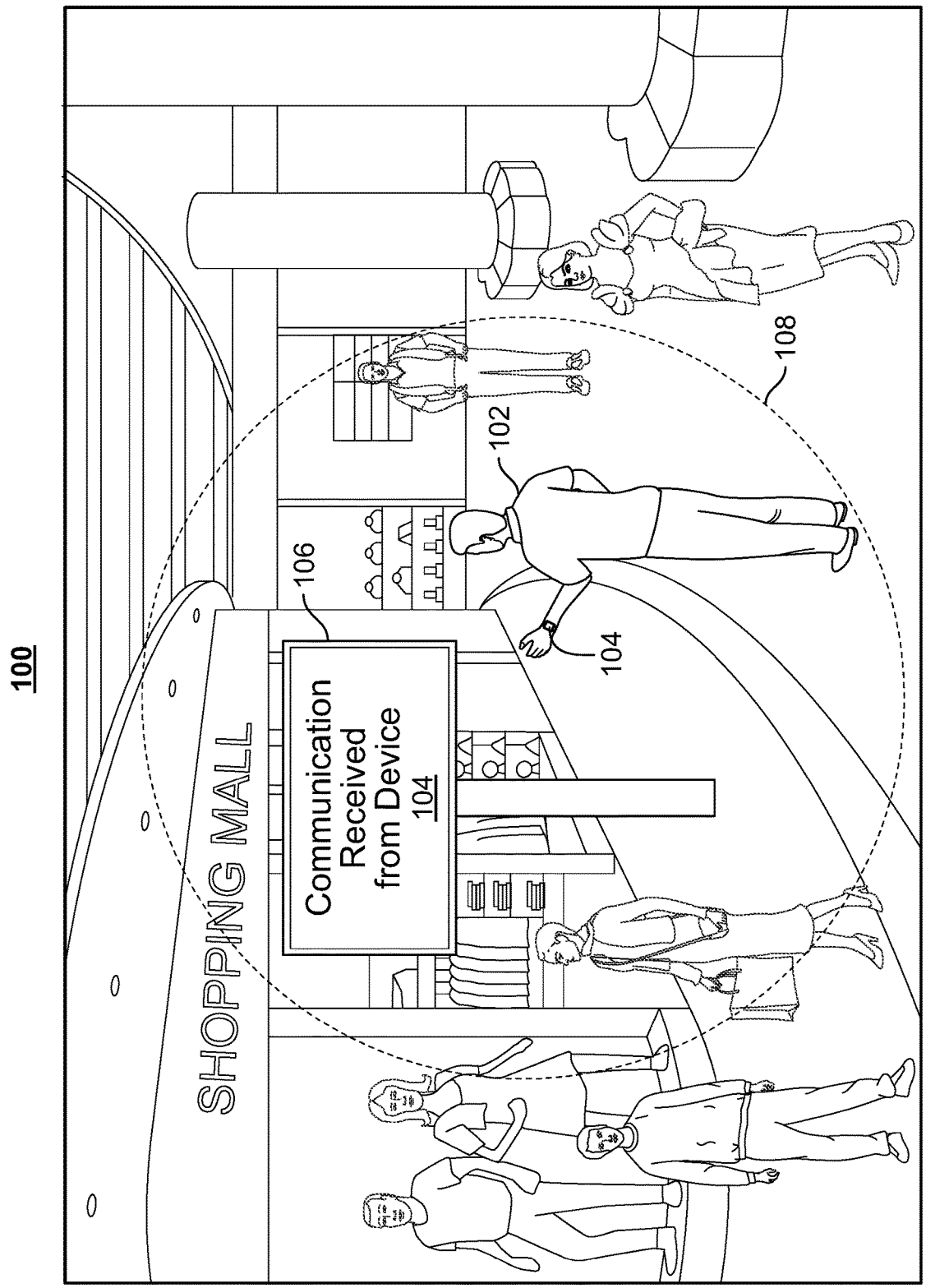
FIG. 1 shows an illustrative example of a scenario for connecting a private device to a public device, in accordance with some embodiments of the disclosure.

FIG. 1 shows an illustrative example of a scenario for connecting a private device to a public device, in accordance with some embodiments of the disclosure. Scenario 100 depicts user 102 with a private device 104 (e.g., a smartwatch, smartphone, tablet, etc.) in a mall. It should be noted that the private device may be wearable as well. User 102 may have initiated a communication between private device 104 and public device 106 (e.g., a display). Accordingly, public device 106 has generated for display a message stating "communication received from device 104." Public device 106 may then initiate a session with private device 104, allowing user 102 to access content via public device 106 and/or private device 104. Furthermore, public device 106 may determine a proximity 108 within which private device 104 must remain in order to maintain the session. As a result, if private device 104 is removed from within proximity 108, public device 106 may end the session and not accept commands from private device 104.

Figure 2:
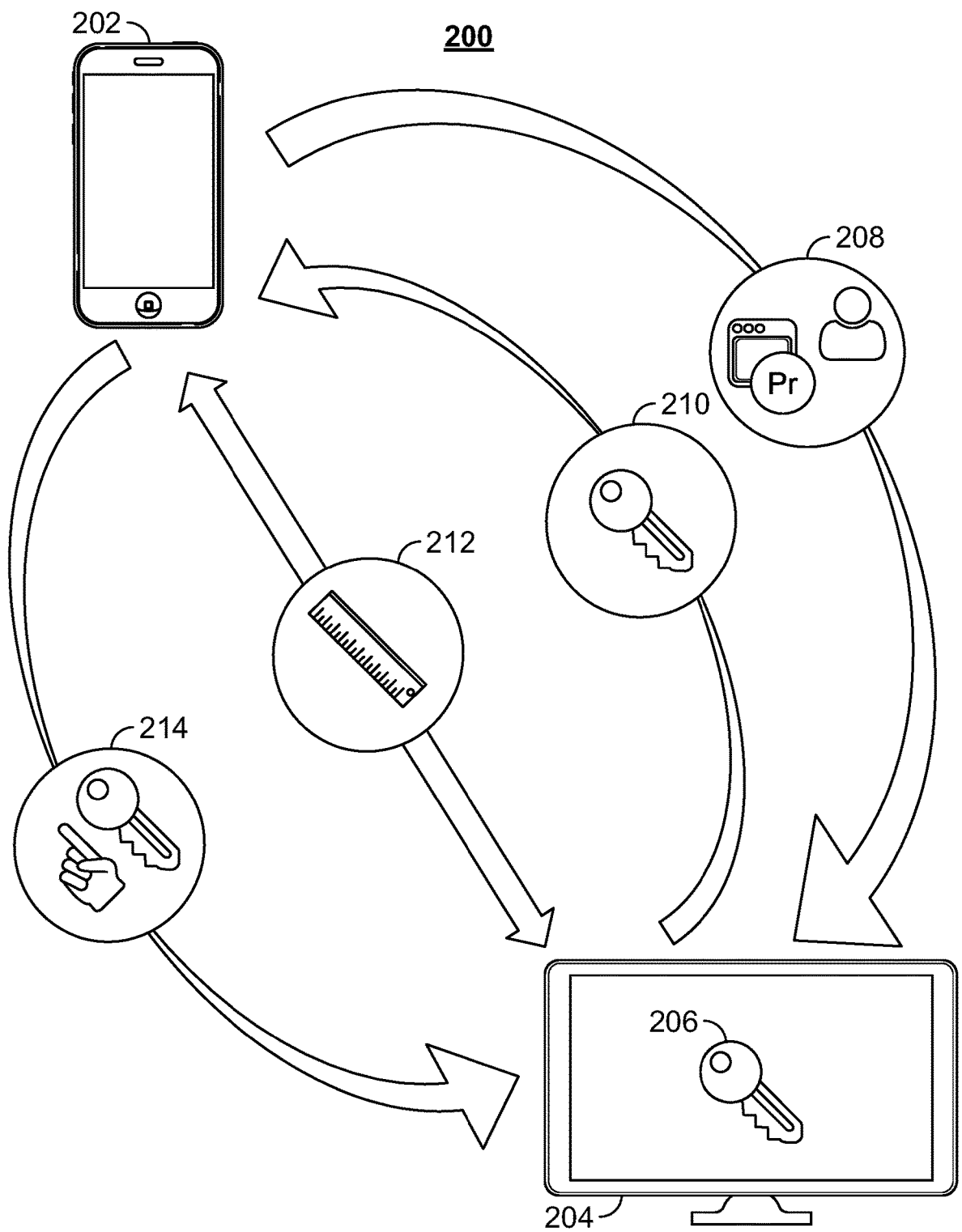
FIG. 2 shows a block diagram for connecting a public device to a private device in order to receive and execute a user command, in accordance with some embodiments of the disclosure.

FIG. 2 shows a block diagram for connecting a public device to a private device in order to receive and execute a user command, in accordance with some embodiments of the disclosure. A media guidance application may receive a communication from private device 202, implementing a private interface application, indicating that a user wishes to use public device 204. Private device 202 may be any electronic device that the user has access to and/or owns, and that is capable of communicating with other devices. Public device 204 may be any electronic device that is available for access by several users and is capable of communicating with other devices. Examples of private and public devices include, but are not limited to, displays, smartphones, smartwatches, smart speakers, computers, biometric devices, video game consoles, etc. The communication received from private device 202 may be in the form of a communication protocol data unit (e.g., a packet, a frame, a cell, etc.) in which the destination of the data unit is the communication address of public device 204.

In some embodiments, the communication from private device 202 is transmitted to public device 204 in response to receiving, at private device 202, a broadcast message inviting private device 202 to access public device 204. In some embodiments, the broadcast message inviting private device 202 to access public device 204 is transmitted by public device 204, in response to determining that private device 202 is within a predetermined displacement from public device 204. For example, public device 204 may broadcast discovery messages in order to detect devices. In response, public device 204 may receive acknowledgment responses with received signal strength indicator (RSSI) values from the devices that received the discovery message. The media guidance application may determine, using a lookup table which returns distance as a function of RSSI, the distance between public device 204 and the acknowledging device. In response to determining that the distance is within a predetermined displacement from public device 204, the media guidance application of public device 204 may transmit the message inviting the acknowledging device (e.g., the user's private device) to access public device 204.

For example, private device 202 may be the user's smartphone, on which the media guidance application is installed. The private interface application (e.g., the YouTube mobile app, the Spotify app, etc.) may be either stored or running (e.g., in the foreground/background) on private device 202. The user may specifically wish to transmit, from private device 202 to public device 204, a command that is associated with the private interface application. In some embodiments, the media guidance application may display information about all public devices available for access in the vicinity of private device 202. For example, the media guidance application may provide a map/list of public devices nearby and may allow the user to select public device 204 in order to send a request to connect. It should be noted that the media guidance application may be installed on a remote server, instead of the user's device. Accordingly, the remote server may communicate with private device 202 in order to provide the list/map of accessible public devices in the user's vicinity. Furthermore, the media guidance application may be integrated with the private interface application. Thus, the user may be able to view the map/list from the private interface application directly. For example, public device 204 may be a large touchscreen display located in a mall. The public display may receive the user's request to connect from the user's smartphone. The communication between private device 202 and public device 204 may be implemented over various communication infrastructures including, but not limited to, Wi-Fi, Bluetooth, cellular networks, wired connections (e.g., Ethernet), etc. Various servers, routers, switches, hubs, etc., may serve as intermediate devices configured to pass data between public device 204 and private device 202.

In some embodiments, public device 204 and private device 202 may not be compatible. For example, public device 204 may be a public display with an iOS™-based operating system and private device 202 may be a smartphone with a Windows-based operating system. In some cases, the two respective devices may be unable to communicate due to their differences in programming. As a result, the media guidance application may determine that private device 202 is of a first operating system type and public device 204 is of a second operating system type. The media guidance application may determine that the first operating system type is incompatible with the second operating system type. In response to receiving a first message (e.g., command, request, data packet) that is encoded using the first operating system type by the private interface application and is to be sent to public device 204, the media guidance application may translate the content of the first message and generate a second message encoded using the second operating system type that includes the content of the first message. The media guidance application may then record the first message in a log and may transmit the second message to public device 204.

The media guidance application may request, from private device 202, both user authorization information and an identifier for the private interface application. In response to the user making a selection of public device 204, the media guidance application may create a temporary connection between private device 202 and public device 204. The temporary connection may allow private device 202 and public device 204 to communicate without providing access to the functionality of either device (e.g., the ability to access and display the content). Accordingly, private device 202 may receive from either public device 204 or a remote server with the media guidance application, a request for user authorization information and an identifier of the private interface application. The user authorization information may comprise data required to verify the user's identity with the content provider. For example, the user authorization information may list the subscriptions the user possesses and the respective login keys (e.g., username, password, security questions, PIN codes, etc.) to access the subscriptions. The identifier of the private interface application may be any descriptive attribute of the private interface application including, but not limited to, a name, a logo, a developer name, software details (e.g., build number, version, compatible operating system), a screenshot of the user interface, etc. It should be noted that the identifier may comprise a combination of descriptive attributes. For example, an identifier may include the name of a content provider (e.g., Netflix™) associated with the private interface application, the version of the private interface application (e.g., version 5.6), and the compatible operating systems (e.g., iOS™, Android™). Thus, in this example, the identifier private device 202 may provide to public device 204 is "Netflix™, Android™ application version 5.6." As depicted by transfer 206, private device 202 may transmit, to public device 204, the user authorization information (e.g., represented by user icon) and the identifier of the private interface application (e.g., represented by an application icon labelled "Pr").

The media guidance application may then generate, at public device 204, authorization key 208 that is unique to private device 202 based on (i) the user authorization information, (ii) the identifier and (iii) connection parameters, wherein authorization key 208 is required to cause public device 204 to execute commands received from private device 202 during a session. Continuing from the previous example, the identifier for the private interface application is "Netflix™, Android™ application version 5.6." The user authorization information may thus comprise a username and password to the user's Netflix™ account. The connection parameters represent conditions that must be met in order to maintain the connection between public device 204 and private device 202. For example, the connection parameters may comprise a predetermined proximity to public device 204, within which private device 202 must remain in order for authorization key 208 to remain valid. The connection parameters may comprise restrictions on certain commands that the user may request. For example, the user may request that public device 204 perform a task that demands heavy processing as it requires high-end graphics (e.g., the command may be to generate for display a video game). In this example, public device 204 may not be able to execute the command because the processing needed for the command exceeds public device 204's technical capabilities. In the absence of connection parameters, public device 204 may get damaged while trying to execute the command (e.g., may cause corrupted files and/or overheating at the motherboard). Accordingly, the media guidance application may take public device 204's technical capabilities into consideration and limit the user to commands that public device 204 can implement. This information is thus included in the connection parameters. Similarly, the connection parameters may include information such as the connection type (e.g., Wi-fi, cellular data, etc.) established between private device 202 and public device, the location of the respective devices, time limits for accessing public device 204 (e.g., allow the connection between public device 204 and private device 202 for one hour only), etc. Authorization key 208 may be encrypted by symmetric and/or public/private encryption method. This provides security and prevents other devices from sending commands on behalf of private device 202. An example of an authorization key may be "AUTH:username-password_ID:identifier_PARA:parameters." Therefore, if the username of a user is "user123," the password is "pass123," the identifier is "Netflix™, Android™ application version 5.6," and the connection parameters include a predetermined proximity, private device 202 serial number, public device serial number, connection type, minimum data transfer rate, and time limit (e.g., 5m-private123-public321-bluetooth-100 kbps-60 min), authorization key 208 in its entirety may be "AUTH:user123-pass123_ID:Netflix™ [Android™, v5.6]_PARA:5m-private123-public321-bluetooth-100 kbps-60 min."

In some embodiments, the user may not need to provide user authorization information because the user may be interested in accessing a publicly accessible application on public device 204. For example the user possesses a cellphone that does not have smartphone features. The user may wish to read the news, look up the weather, or browse the Internet. Accordingly, the user may not be able to perform those tasks on private device 202 and also does not need authorization information to pull up the user's profile (e.g., Netflix™ account with preferences). Thus, when the media guidance application requests user authorization information, the user may not provide user authorization information via private device 202. In response, the media guidance application may not include user authorization information in authorization key 208 (e.g., leave the text after "AUTH" empty).

As depicted as transfer 210, the media guidance application may then transmit, to private device 202, authorization key 208 and in response to transmitting authorization key 208, the media guidance application may initiate a session, at public device 204, with private device 202. The session may be a formal connection between public device 204 and private device 202 in which commands can be exchanged between the respective devices. The formal connection may be established over various communication infrastructures including, but not limited to, Wi-Fi, Bluetooth, cellular networks, wired connections (e.g., Ethernet), etc. It should be noted that authorization key 208 is required to execute commands, at public device 204, received from private device 202 during the session.

As depicted as transfer 212, the media guidance application may then receive, at public device 204, a first communication from the private interface application. The media guidance application may parse, at public device 204, the first communication to identify authorization key 208 and a command (e.g., represented as a pointing hand) to execute on public device 204. The command is a task that the user assigns to public device 204.

Furthermore, the command may be associated specifically with the private interface application. For example, if the private interface application is a video streaming application such as the Netflix™ mobile app, the user may initiate a first communication with public device 204 by sending a command that requests that public device 204 download a public interface application (e.g., a corresponding Netflix™ application) that is compatible with the private interface application. The command may also be to change a setting of public device 204 (e.g., increase volume, decrease brightness, etc.). The commands may be transmitted as text from private device 202 to public device 204, verbally from the user to public device 204, via gestures or any visual indication of a command from the user/private device to public device 204, or biometric changes (e.g., changes in heart rate, tightening of muscles, etc.). It should be noted that not all public devices may have displays (e.g., smart speakers, augmented reality devices, hologram generators, etc.). For those particular public devices, an appropriate user interface that is compatible with public device 204 and allows user interaction via the private interface application may be used. Based on the examples listed above, these substitute user interfaces may be an audio user interface (e.g., where a menu is read aloud to the user), augmented reality user interface (e.g., allows the user to see an augmented reality screen via private device 202), or a holographic projection user interface (e.g., where the menu is projected).

The media guidance application may then validate, at public device 204, authorization key 208. Validating authorization key 208 may involve two steps: (1) determining whether authorization key 208 received from private device 202 matches authorization key 208 transmitted by public device 204 to private device 202 and (2) determining whether the connection parameters are satisfied. For example, the media guidance application may store a copy of authorization key 208 for a threshold time (e.g., three minutes) when transmitting authorization key 208 to private device 202. Thus, private device 202 must send a command within the threshold time before the media guidance application erases authorization key 208 from the memory of public device 204. In response to receiving a command (e.g., as a first communication), the media guidance application may decrypt authorization key 208 at public device 204 and determine whether the received authorization key matches authorization key 208 in the memory of public device 204. If the respective authorization keys match, the media guidance application may determine whether the connection parameters of authorization key 208 are satisfied (e.g., whether the connection type is the same, the data transfer rate is locked to a threshold speed, private device 202 is within the predetermined proximity (e.g., verification 214), the time elapsed within the time limit, etc.). If the received authorization key matches and each connection parameter is satisfied, the media guidance application may validate authorization key 208. In response to validating authorization key 208, the media guidance application may execute, at public device 204, the command. For example, the command may be to generate for display, on public device 204, a media asset selected on the private interface application (e.g., a movie selected on the Netflix™ mobile application).

In some embodiments, authorization key 208 may be different for each communication exchanged between public device 204 and private device 202. For example, authorization key 208 may additionally comprise a timestamp in order to allow the media guidance application to determine the order at which communications were received and also to distinguish each private device that may be sending communications to public device 204 (e.g., when multiple private devices are connected to public device 204). In response to the initiation of a session between public device 204 and private device 202, the media guidance application of private device 202 may begin sending commands from the private interface application to public device 204. Authorization key 208 previously sent by public device 204 may accompany the command from private device 202. In response to receiving the command and authorization key 208, the media guidance application may parse authorization key 208 to determine whether it matches authorization key 208 generated at public device 204. In response to determining a match, the media guidance application of public device 204 may execute the command sent by the private interface application. In response to determining that authorization key 208 does not match, the media guidance application of public device 204 may end the session. Furthermore, the media guidance application of public device 204 may generate a new authorization key and transmit the new authorization key to private device 202, in response to receiving a command from the private interface application that is accompanied by an authorization key that matches the authorization previously transmitted by public device 204.

In some embodiments, the connection parameters may comprise a predetermined proximity to public device 204 within which private device 202 must remain in order for authorization key 208 to remain valid. The predetermined proximity may be a physical distance/displacement that represents the furthest point private device 202 can be from public device 204 in a particular direction. For simplicity, the predetermined proximity may be interpreted as a connection "sphere" of a certain radius (e.g., five meters). Accordingly, private device 202 may be up to five meters from public device 204 in any direction in order for the private interface application to communicate with the public interface application. Due to the presence of obstacles (e.g., walls, objects, etc.), the predetermined proximity may not be the same in all directions. For example, the predetermined proximity perpendicular to the display of public device 204 and parallel to the floor may be five meters. However, the predetermined proximity perpendicular to the floor and the display of public device 204 (e.g., pointing upwards) may be three meters due to the presence of a ceiling (e.g., the ceiling may significantly reduce the signal strength). Public device 204 may further generate for display/audio the predetermined proximity for the user on public device 204.

The media guidance application may generate, at public device 204, authorization key 208 by retrieving a device identifier of private device 202. The device identifier may be a descriptive attribute of private device 202 such as at least one of the device name, device type, model number, serial number, manufacturer name, battery life, etc. Multiple descriptive attributes may make up a device identifier. For example, if private device 202's manufacturer is Google, the name of the device is Pixel XL, the model number is 2, and the serial number is 12345, the device identifier may be "Google Pixel XL 2, 12345."

The media guidance application may then determine a connection strength between private device 202 and public device 204. The connection strength may be a quantitative or qualitative value that represents the quality of the connection between two or more devices. The connection strength may be described using data transfer rates (e.g., download/upload speeds) or signal power. For example, if the connection strength is a quantitative value, the media guidance application may transmit a test message from private device 202 to public device 204 and measure, at public device 204, the download transfer rate (e.g., megabytes per second). The media guidance application may then send a test message from public device 204 to private device 202, and may measure, at private device 202, the download transfer rate. It should be noted that the transfer rates at public device 204 and private device 202 are with respect to each other only. For example, private device 202 may have a general download transfer rate when connected to a different device, and the general download transfer rate may be different from the transfer rate with public device 204. In response to determining the respective download transfer rates at each respective device, the media guidance application may determine the average download transfer rate between the respective devices. The average download transfer rate (e.g., 5 Mbps) may represent the connection strength. A similar procedure may be used by the media guidance application to determine the average upload transfer rate, which may also be used to represent the connection strength. In some embodiments, the media guidance application may determine the connection strength by determining that average transfer rate by averaging the average download transfer rate and the average upload transfer rate. In some embodiments, the connection strength may be represented by the lowest transfer rate between the respective devices. For example, if the upload transfer rates of private device 202 and public device 204 are 2 Mbps and 3 Mbps, respectively, and the download transfer rates are 10 Mbps and 15 Mbps, respectively, the connection strength may be represented as 2 Mbps.

When the connection strength is represented qualitatively, the media guidance application may determine the quantitative value of the signal strength/transfer rate and refer to data structure that converts the quantitative value to a qualitative value. For example, the data in the data structure may be predetermined by the media guidance application. Furthermore, each quantitative range may represent a qualitative value. In this example, there are five qualitative classifications of the connection strength: poor, below average, average, above average and strong. In terms of transfer rates, the respective transfer rate ranges for each classification may be 0-0.5 Mbps, 0.5-1 Mbps, 1 Mbps-3 Mbps, 3 Mbps-5 Mbps, and 5+ Mbps. In terms of signal power, the respective signal power ranges may be −113--100 dBm, −100--80 dBm, etc.

The media guidance application may then determine the predetermined proximity, based on the device identifier and the connection strength. For example, the media guidance application may retrieve, using the device identifier, additional information about private device 202. The additional information may include technical details about private device 202 such as compatible connection types (e.g., Bluetooth, cellular, Wi-Fi, etc.) and processing capabilities (e.g., from a processor chip specification). Using this information, alongside the connection strength, the media guidance application may determine a maximum distance that private device 202 can be from public device 204 without dropping the connection strength or causing private device 202 to exhaust processing.

In some embodiments, the media guidance application may receive, at public device 204, a received signal strength indicator (RSSI) from private device 202. The media guidance application may set the RSSI value as the connection strength. An RSSI represents the power of a received signal. The media guidance application may then approximate a distance between public device 204 and private device 202. For example, the media guidance application may determine that the RSSI of the original transmitted signal is 0 and the RSSI received at private device 202 is −20. The media guidance application may determine, using a lookup table that returns distance as a function of RSSI, the distance between private device 202 and public device 204.

The user authorization information may comprise a user profile. Accordingly, the media guidance application may also determine an application usage history based on the user profile. For example, the application usage history may list all of the applications the user has accessed in a period of time. Alongside listing the application name, the application usage history may track the amount of time the user spent accessing an application, and the number of times the user has accessed the application. The media guidance application may then determine an anticipated processing ratio between private device 202 and public device 204, based on the application usage history and the device identifier. The purpose of determining an anticipated processing ratio between the respective devices is to balance the processing requirements between public device 204 and private device 202. For example, multiple private devices may be connected to public device 204. In order to ensure that a user's command is executed at public device 204, public device 204 may reserve a certain amount of processing power for the user and assign additional processing to private device 202.

In some embodiments, determining the anticipated processing ratio between private device 202 and public device 204 further comprises the media guidance application determining a first processing limit of private device 202 based on the device identifier and a second processing limit of public device 204. For example, the device identifier of private device 202 may be "Google Pixel XL 2." The media guidance application may retrieve additional information about private device 202 using the Internet. Specifically, the media guidance application may determine that private device 202 is a smartphone with a Qualcomm Snapdragon 835 processing chip and 4 gigabytes of RAM. Based on the additional information retrieved using the device identifier, the media guidance application may set the first processing limit to 4 GB RAM at 2.35 GHz. For example, the technical capabilities of public device 204 may be 8 GB RAM at 2.5 GHz (e.g., which may be set as the second processing limit). The media guidance application may determine an average processing requirement associated with at least one application in the application usage history. For example, the media guidance application may select the private interface application as the at least one application in the application usage history and retrieve metadata associated with the private interface application. The metadata may list the average processing requirement of the private interface application. For example, the average processing requirement of the Netflix™ mobile application may be 512 MB RAM at 1.8 GHz. In some embodiments, the media guidance application may determine the likelihood of the user accessing an application listed in the application usage history. For example, the media guidance application may use a probability model as a function of frequency of usage, total amount of times accessed, and the time length of each access, in order to determine the likelihood of the user accessing an application. The media guidance application may then select the application with the highest likelihood and determine its average processing requirement. In some embodiments, the media guidance application may determine the average processing requirement by averaging the processing requirements of all applications listed in the application usage history. In some embodiments, the media guidance application may identify the application with the highest processing requirement and set the respective processing requirement as the average processing requirement.

Furthermore, the media guidance application may identify power consumption information of private device 202 based on the device identifier. For example, the additional information retrieved by the media guidance application based on the device identifier, may include the maximum battery capacity of private device 202. For example, the battery capacity of private device 202 may be 3,520 mAh. In this example, the device identifier lists the battery life of private device 202 as 80% battery remaining. The media guidance application may determine that the power consumption information indicates a remaining battery of 80% of 3,520 mAh (i.e., 2816 mAh). In addition, the power consumption information may indicate the amount of time the remaining battery can be used when private device 202 is functioning at a specific processing scheme. For example, the power consumption information may indicate private device 202's battery will remain charged (e.g., above 0%) for 0.5 hours when utilizing 3 GB RAM and 1.5 GHz of processing.

The media guidance application may thus determine a first anticipated processing load for private device 202, based on the power consumption information and the first processing limit. Additionally, the media guidance application may determine a second anticipated processing load for public device 204, wherein a sum of the first anticipated processing load and the second anticipated processing load is greater than or equal to the average processing requirement. For example, the private interface application may be the Netflix™ mobile application and the user may send commands based on the Netflix™ mobile application (e.g., mirroring the application, downloading a public interface application associated with the private interface application, etc.). The average processing requirement for the private interface application and/or the public interface application of Netflix™ may have an average processing requirement of 512 MB RAM at 1.8 GHz. The media guidance application may allocate 256 MB RAM and 1.8 GHz of the second processing limit for public device 204. Similarly, the media guidance application may allocate 256 MB RAM and 1.8 GHz of the first processing limit for private device 202. This may ensure that anticipated commands from the user are executed. It should be noted that the sum of the respective anticipated processing loads equals the average processing requirement. In some embodiments, the media guidance application may allocate the entire average processing requirement as the second anticipated processing load. This minimizes the processing that must be performed at private device 202 and reduces the amount of communication that must be carried out between public device 204 and private device 202. In conditions where the average processing requirement is less than the second processing limit, the media guidance application may treat public device 204 as a thick client for heavy processing duties and may treat private device 202 as a thin client for sending basic communications (e.g., exchanging commands and processing status information).

In some embodiments, the media guidance application may determine that a second private device is connected with public device 204. Accordingly, the second processing limit of public device 204 may be lower than the maximum processing capabilities of public device 204 because the media guidance application may previously have allocated a third anticipated processing load for public device 204. Therefore, the media guidance application may determine the second anticipated processing load based on the remaining processing capabilities of public device 204 and allocate the rest to the first private device as the first anticipated processing load.

The media guidance application may then determine the anticipated processing ratio between private device 202 and public device 204, based on the first anticipated processing load and the second anticipated processing load. For example, the media guidance application may determine a percentage of the average processing requirement that was allocated to public device 204 and a percentage that was allocated to private device 202. In the previous example, both devices were allocated an equal anticipated processing load (e.g., 50% each). The anticipated processing ratio of private device 202 to public device 204 is therefore 50:50 (i.e., 1:1). Suppose the percentage for public device 204 was 70% and the percentage for private device 202 was 30%. The anticipated processing ratio would thus be 30:70 (i.e., 3:7). In some embodiments, the anticipated processing ratio may be of public device 204 to private device 202 (e.g., 70:30).

In terms of determining the predetermined proximity, the media guidance application may then determine a radial displacement between private device 202 and public device 204, wherein when private device 202 is a distance, less than or equal to the radial displacement, from public device 204, (i) the connection strength does not decrease by more than a degradation threshold and (ii) the anticipated processing ratio does not increase by more than a processing limit threshold. For example, the distance, between private device 202 and public device 204 at which the connection strength (e.g., "good") is determined, may be three meters. The media guidance application may determine a radial displacement representing the farthest private device 202 can be from public device 204 without reducing the connection strength by a degradation threshold. The degradation threshold may be an amount (e.g., percentage, fraction, value) of the connection strength that represents a significant change in the quality of a connection. For example, the media guidance application may determine a radius of 6 meters. The radius may indicate that private device 202 can be up to 6 meters away from public device 204, without reducing the connection strength (e.g., to "above average"). Furthermore, the media guidance application may determine that as private device 202 moves farther away from public device 204, public device 204 and/or private device 202 may expend more processing in communicating with one another. For example, the user may have issued a command to public device 204 to retrieve a video game and generate for display. As private device 202 moves farther away from public device 204, or behind obstacles, the media guidance application may attempt to reduce the processing load of public device 204 and allocate more processing on private device 202 (e.g., to ensure that the user has immediate access to the video game or to reduce the latency between the user issuing a command and the command's execution at public device 204). The change in processing loads may thus change the processing ratio. For example, the processing ratio between private device 202 and public device 204 may be 50:50. However, due to the increase in distance between private device 202 and public device (e.g., beyond the radial displacement), the connection strength may decrease and the processing ratio may become 70:30 (e.g., increase processing at private device 202 to make up for the degradation in the connection strength). The processing limit threshold may be a maximum change in processing loads before the connection between public device 204 and private device 202 may become unstable. The processing limit may be the difference between the first processing limit and the processing load of private device 202. For example, if an increase in the processing load of private device 202 is equal to the processing limit of private device 202, the media guidance application may determine that the connection is unstable and may end the session. Similarly, if the increase in the processing load of public device 204 is equal to the processing limit of public device 204, the media guidance application may determine that the connection is unstable and may end the session.

Thus, the media guidance application may determine the predetermined proximity based on the radial displacement. For example, if the radial displacement is 6 meters from public device 204, the media guidance application may determine a buffer distance beyond the radial displacement in which the connection strength between private device 202 and public device 204 reduces beyond a connection strength threshold (e.g., 50% degradation from the originally determined connection strength). The predetermined proximity may represent a sum of the radial displacement, and the buffer distance. In some embodiments, the media guidance application may generate for display the connection strength, the radial displacement, and/or the predetermined proximity on public device 204 and/or private device, for the user. Similarly, the media guidance application may also generate for display the connection parameters of the connection on public device 204 and/or private device.

In some embodiments, wherein the connection parameters comprise a predetermined proximity to public device 204 within which private device 202 must remain in order for authorization key 208 to remain valid, the media guidance application may verify that private device 202 is within the predetermined proximity to public device 204. This process is depicted as verification 214 (e.g., represented as a measuring stick). For example, the media guidance application may request RSSI values (e.g., imbed an RSSI value to authorization key 208) from private device 202 and convert the RSSI values to distances based on the lookup table previously discussed. The media guidance application may then determine whether the converted distance (e.g., 3 meters) is greater than the predetermined proximity (e.g., 5 meters). In response to validating authorization key 208 (e.g., determining a match as previously discussed) and verifying that private device 202 is within the predetermined proximity to public device 204, the media guidance application may execute, at public device 204, the command. In some embodiments, the media guidance application may invalidate, at public device 204, authorization key 208, by determining that private device 202 is outside the predetermined proximity to public device 204. For example, if the distance between private device 202 and public device 204 is determined to be 7 meters and the predetermined proximity is 5 meters, the media guidance application may no longer accept authorization key 208. Instead, the media guidance application may mark authorization key 208 as invalid to prevent further communication using authorization key 208. In response to invalidating authorization key 208, the media guidance application may also end the session between public device 204 and private device 202.

In some embodiments, the user authorization information is a universally unique identifier (UUID) or globally unique identifier (GUID) generated by the private interface application in response to verifying a login name and password entered into the private interface application, and wherein the user authorization information is valid for a predetermined time after verifying the login name and password. For example, the user authorization may be an identifier that represents the user's login name and password. Accordingly, the actual values of the login name and password are not exposed to public device 204. Instead, the media guidance application assigns a UUID or a GUID associated with the user in response to verifying the user's login name/username and password. For example, the predetermined time may be one hour. Thus, the UUID and GUID may become invalid after one hour. The media guidance application may then re-verify the user's login name and password.

In some embodiments, public device 204 may be configured to automatically remove the user authorization information from memory on public device 204 upon deactivation (e.g., ending the session) of the public interface application on public device 204. Additionally, the private interface application may be configured to retain the user authorization information in memory on private device 202 upon deactivation of the private interface application on private device 202. For example, the media guidance application may remove the user authorization information from public device 204 to prevent other users from accessing the user's content. As mentioned previously, the user authorization information may be in the form of a UUID or a GUID. Accordingly, the media guidance application may store the user authorization information on public device 204. If the predetermined time in which the UUID/GUID is valid is five days, the media guidance application may seamlessly connect public device 204 and private device 202 without the need for verifying the user's login name and password for the content provider within the five days.

Figure 3:
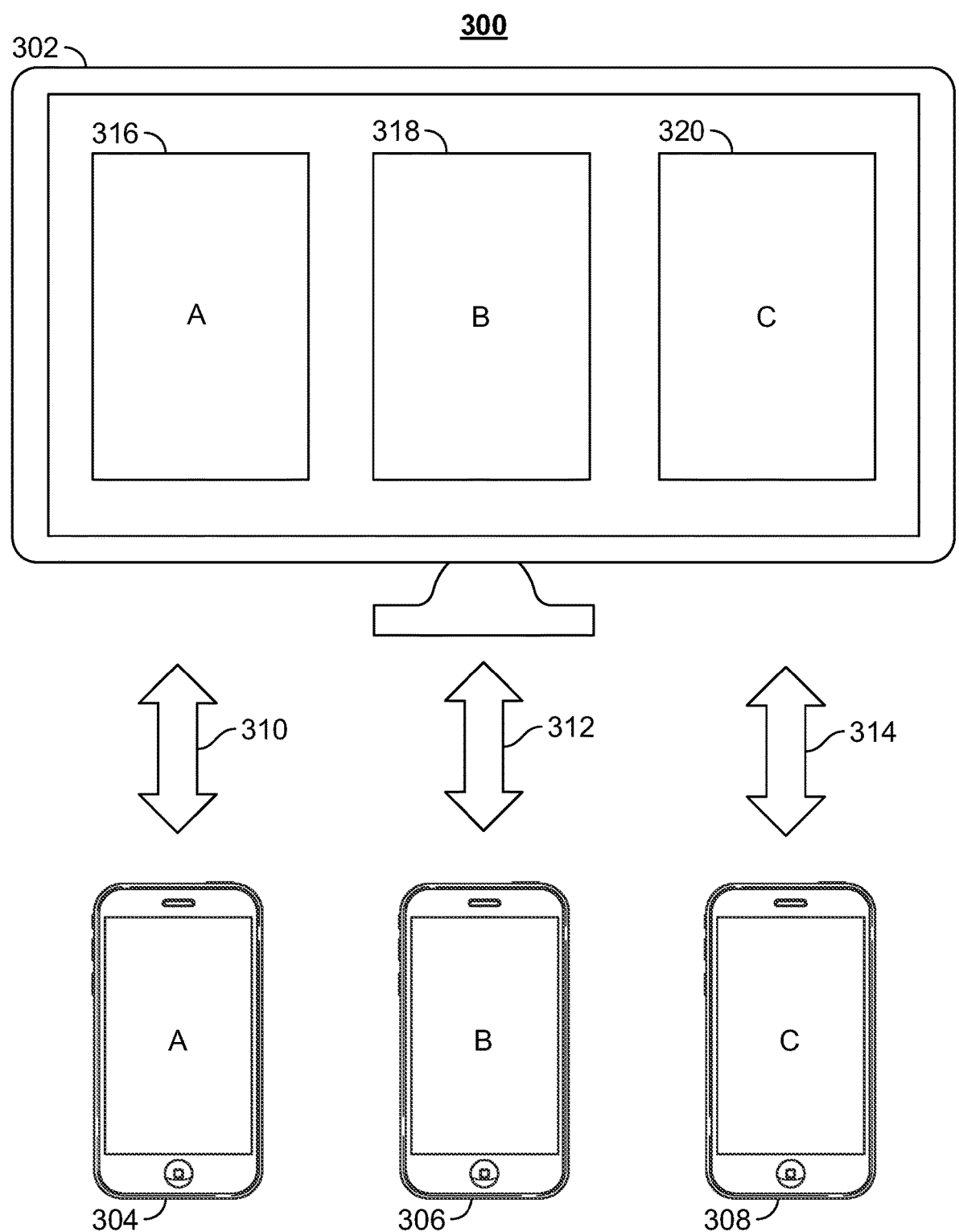
FIG. 3 shows an illustrative example of multiple private devices connecting to a public device, in accordance with some embodiments of the disclosure.

FIG. 3 shows illustrative example 300 of multiple private devices connecting to a public device, in accordance with some embodiments of the disclosure. Private device 304, private device 306, and private device 308 may individually and independently send respective communications requesting to connect to public device 302. In response, the media guidance application may implement one of the aspects mentioned above for each private device.

Suppose that private device 304 is running a private interface application "A," private device 306 is running a private interface application "B," and private device 308 is running a private interface application "C." The devices may generate communications path 310, communications path 312, communications path 314 with public device 302, respectively. Each communications path represents a session between the private device and the public device. Thus, public device 302 may exchange communication data units (e.g., packets, frames cells, etc.) on the respective paths depending on the connection type with the private device (e.g., Internet, cellular, Bluetooth, etc.). As an example, each path may be used for transfer 206, 210, and 212. Similarly, each communications path may be used independently for verification 214.

Suppose that public device 302 is a display. The users of the private devices may wish to send commands to generate, for display, public interface applications corresponding to the private interface application running on their respective private devices. The public interface application may allow a user to access content that is available to the public (e.g., movies, shows, video games, etc.). In an example, if the private interface application is the Netflix™ mobile application, the public interface application may be another version of the Netflix™ application that is built specifically for displays. In response to initiating a connection session with multiple private devices, the media guidance application on public device 302 may allocate various portions of the display to a respective public interface application associated with a private interface application of each private device. In some embodiments, the allocation may be symmetrical (e.g., display gets split in three equivalent portions of equal resolution when three private devices are connected to the public device). In some embodiments, the allocation of resolution and screen size of each private interface application (e.g., depicted as application 316 "A," application 318 "B," and application 320 "C") may be based on the importance/type of the content displayed. For example, if application 320 is simply a music player and the content is an audio file, the media guidance application may determine that application 320 may allocate a smaller screen size and/or resolution for application 320. In another example, if application 318 is displaying breaking news or content tagged with importance by a content provider/authority (e.g., an emergency evacuation message tagged as "important" by a government), and the other applications on public device 302 are displaying content not tagged as important, the media guidance application may increase the resolution and/or screen size of application 318 and decrease the resolution and/or screen size of application 316 and application 320, accordingly. In some embodiments, private interface application "C" on private device 308 may mirror the graphical user interface of application 320. In some embodiments, private interface application "C" on private device 308 may control the graphical user interface of application 320.

In some embodiments, multiple users may be accessing videos on a single public device. In order to prevent the audio from all videos being accessed from being mixed, the audio of each respective application may be outputted on the associated private device. The public device may split a video media asset, received from the content provider, into a visual and audio media asset, respectively. The public device may forward the audio media asset to the private device. The public device may also identify an audio I/O device associated with the user, such as headphones or speakers, and forward the audio media asset to the audio I/O device.

Suppose that public device 302 is a smart speaker. Due to the absence of a display, the commands received from each of the private devices may be queued and executed in the order in which they were received. In some embodiments, the importance of a command is determined by the media guidance application. Accordingly, a command with a higher importance is executed first and a command with a lower importance is executed subsequently. In some embodiments, the commands are executed simultaneously. For example, a first command from a first private device (e.g., private device 304) may be a verbal input asking the public device to turn on the lights. A second command from a second private device (e.g., private device 306) may be a textual input asking the public device to lower the thermostat temperature. In response to receiving both commands, the public device may execute both commands simultaneously by turning on the lights of the environment and lowering the thermostat temperature at the same time.

Figure 4:
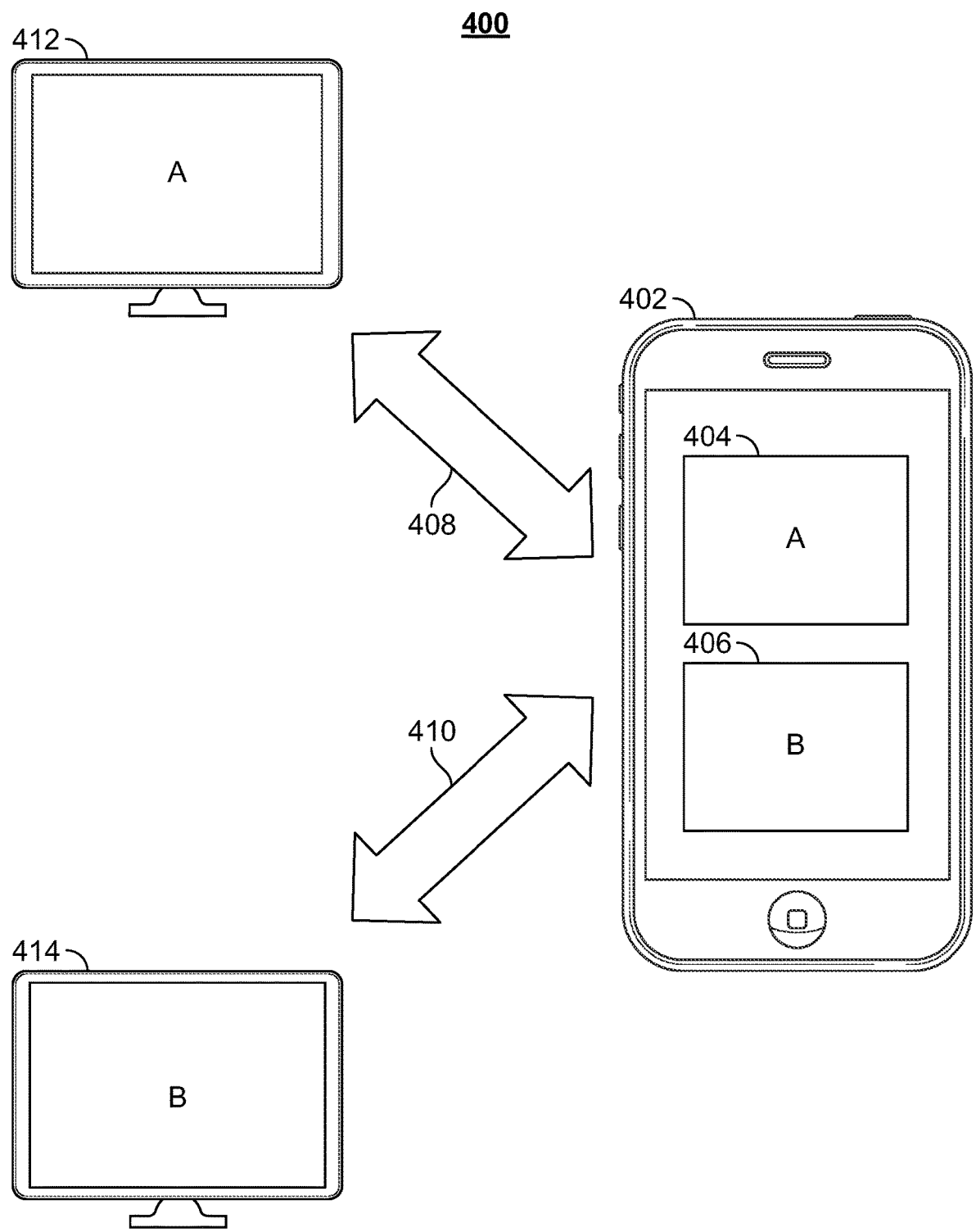
FIG. 4 shows an illustrative example of a private device connecting to multiple public devices, in accordance with some embodiments of the disclosure.

FIG. 4 shows illustrative example 400 of a private device connecting to multiple public devices, in accordance with some embodiments of the disclosure. In this example, private device 402 may communicate with public device 412 and public device 414 in order to access content. In response to receiving a request from private device 402, public device 412 and public device 414 may each utilize one of the aspects of establishing a connection mentioned previously. More specifically, the media guidance application may create communications paths 408 and 410 between public device 412 and private device 402, and public device 414 and private device 402, respectively. Private device 402 may request to access different types of content on each public device. The user of private device 402 may send a command to generate, for display, public interface applications corresponding to the private interface applications running on private device 402. For example, private interface application 404 "A" may be a video streaming application such as YouTube and private interface application 406 "B" may be a music streaming application such as Spotify. The media guidance application may retrieve a public interface application associated with YouTube on public device 412 from the content provider YouTube. Likewise, the media guidance application may retrieve the public interface application associated with Spotify on public device 414 from the content provider Spotify. Private device 402 may simultaneously run private interface application 404 and private interface application 406. In some embodiments, private device 402 may run one private interface application and connect to multiple public devices (e.g., public device 412 and 414). The respective public devices may retrieve and run the same public interface application. Private device 402 may select the same media asset to be generated for display on each public device (e.g., each playing simultaneously at the same/different play positions), or different media assets.

Figure 5:
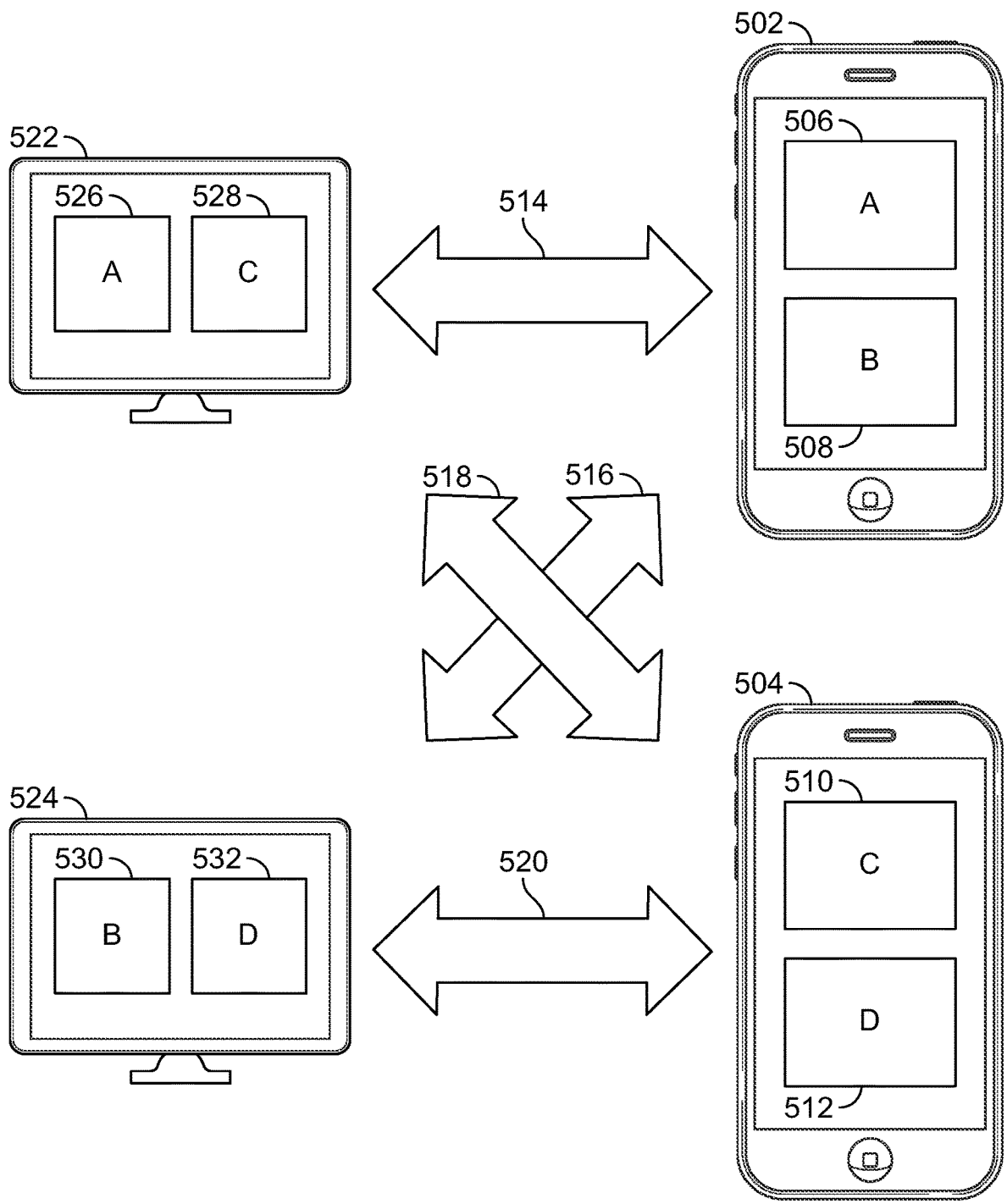
FIG. 5 shows an illustrative example of multiple private devices connecting to multiple public devices, in accordance with some embodiments of the disclosure.

FIG. 5 shows illustrative example 500 of multiple private devices connecting to multiple public devices, in accordance with some embodiments of the disclosure. FIG. 5 combines the concepts disclosed in FIG. 3 and FIG. 4. In example 500, two private devices, private device 502 and private device 504, are connected to two public devices, public device 522 and public device 524. The media guidance application for each respective public device may initiate sessions with each of the private devices in response to receiving communications requesting to connect from the private devices.

Starting with private device 502, which may be running private interface application 506 "A" and private interface application 508 "B," the media guidance application may form communications path 514 with public device 522, and communications path 516 with public device 524. Public device 522 may thus retrieve, from either the content provider, an external server, or private device 502, public interface application 526 that is associated with private interface application 506. The users may send commands to generate, for display, public interface applications corresponding to the private interface applications running on their respective private devices. Thus, public device 524 may retrieve public interface application 530 that is associated with private interface application 508.

Continuing with private device 504, which may be running private interface application 510 "C" and private interface application 512 "D," the media guidance application may form communications path 518 with public device 522, and communications path 520 with public device 524. Public device 522 may thus retrieve, from either the content provider, an external server, or private device 502, public interface application 528 that is associated with private interface application 510. Similarly, public device 524 may retrieve public interface application 532 that is associated with private interface application 512.

Private device 502 and/or private device 504 may be running several (e.g., five) private interface applications simultaneously. The private device may wish to access content associated with three of the private interface applications on public device 522, and two of the private interface applications on public device 524. In other words, the private device is not limited to running a single application on each public device.

Figure 6:
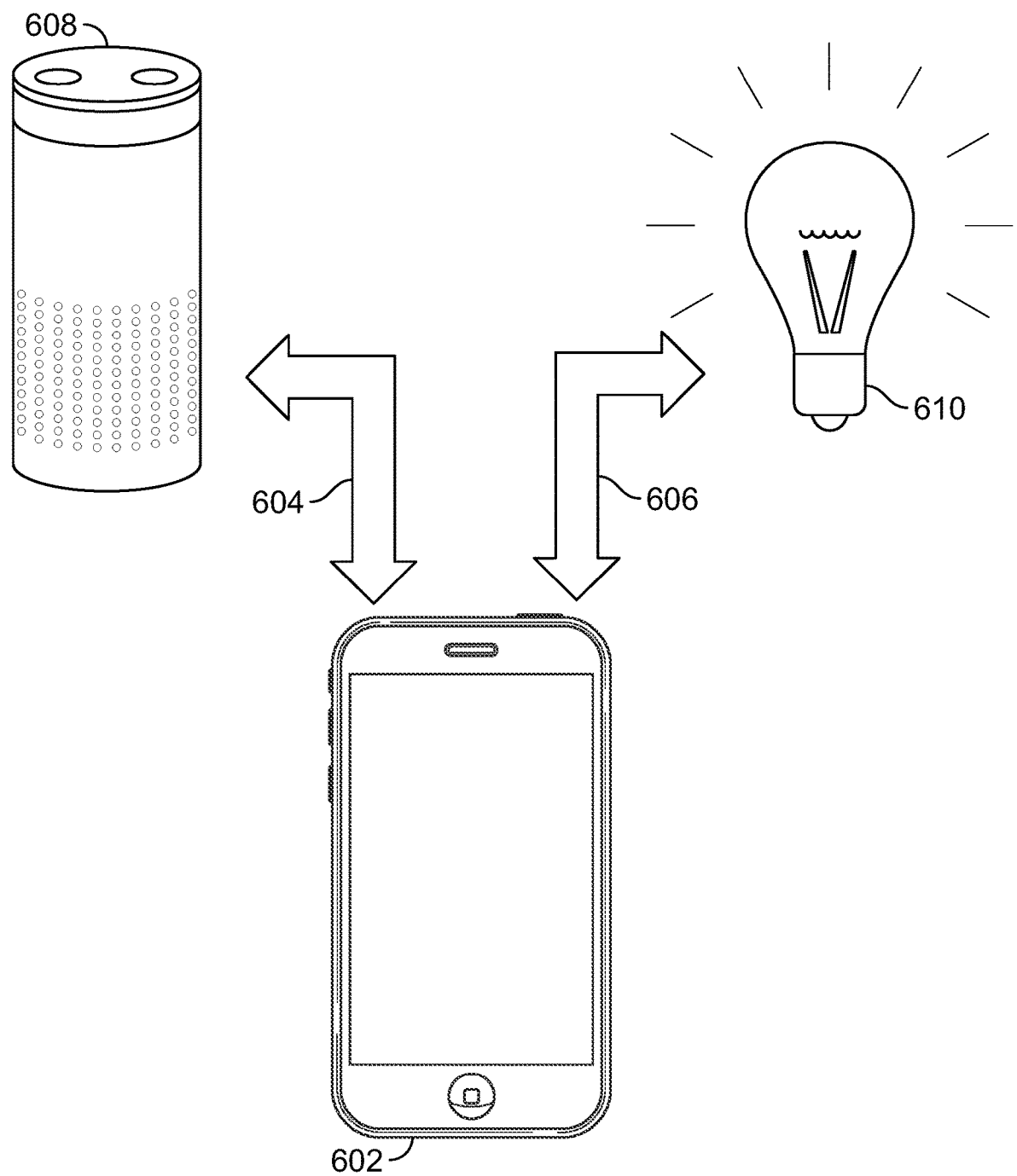
FIG. 6 shows an illustrative example of a private device connecting to multiple public devices without displays, in accordance with some embodiments of the disclosure.

FIG. 6 shows illustrative example 600 of a private device connecting to multiple public devices without displays, in accordance with some embodiments of the disclosure. As shown, private device 602 may be a smartphone/tablet, public device 608 may be a smart speaker (e.g., Amazon Echo), and public device 610 may be a smart bulb. In response to receiving, at public device 608 and public device 610, requests to connect from private device 602, the media guidance application may create communications path 604 and communications path 606, respectively. Accordingly, private device 602 may send commands such as "turn off" to public device 610 and commands such as "tell me the weather" to public device 608.

Users in a content delivery system desire a form of media guidance through an interface that allows users to connect to devices, efficiently navigate content selections, and give executable commands. An application that provides such guidance is referred to herein as an interactive media guidance application or, sometimes, a media guidance application or a guidance application.

Interactive media guidance applications may take various forms depending on the content for which they provide guidance. For instance, a media guidance application may run in the background of a user equipment device and monitor a user's activity. In response to receiving a user command at the user equipment device (e.g., directed towards the media guidance application and/or any alternate application), the media guidance application may execute various processes that the media guidance application is configured to implement. A media guidance application may also be stored on a remote server and may monitor several user equipment devices in real-time through the use of a wireless/wired connection. The media guidance application may execute processes at any of the respective user equipment devices depending on the user commands received at the respective user equipment devices.

Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms.

Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 7:
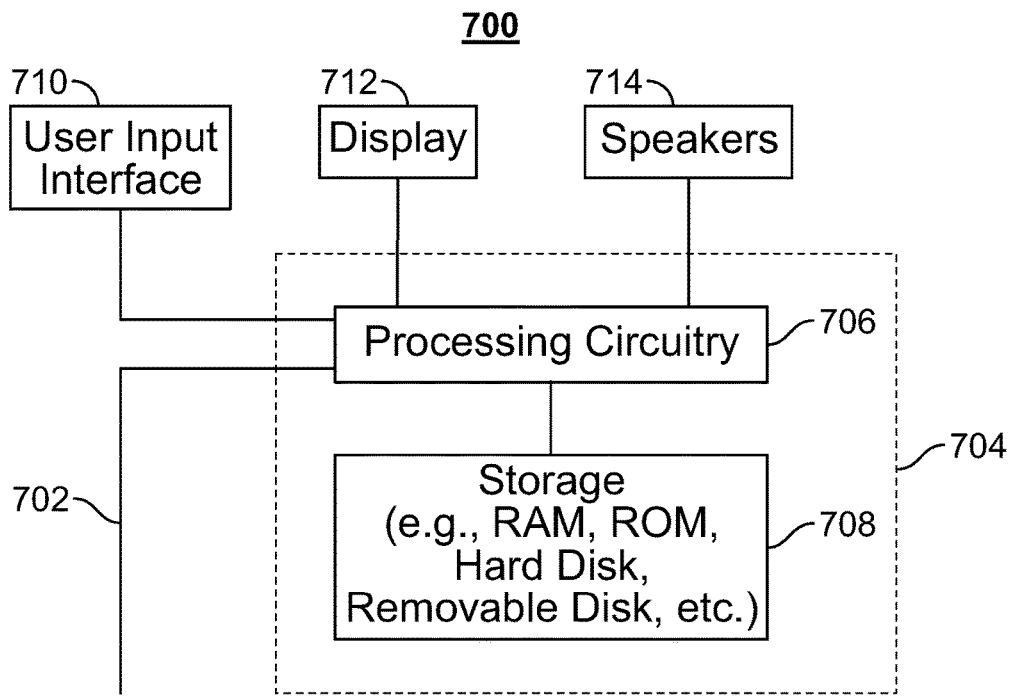
FIG. 7 is a block diagram of an illustrative user equipment device in accordance with some embodiments of the disclosure.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
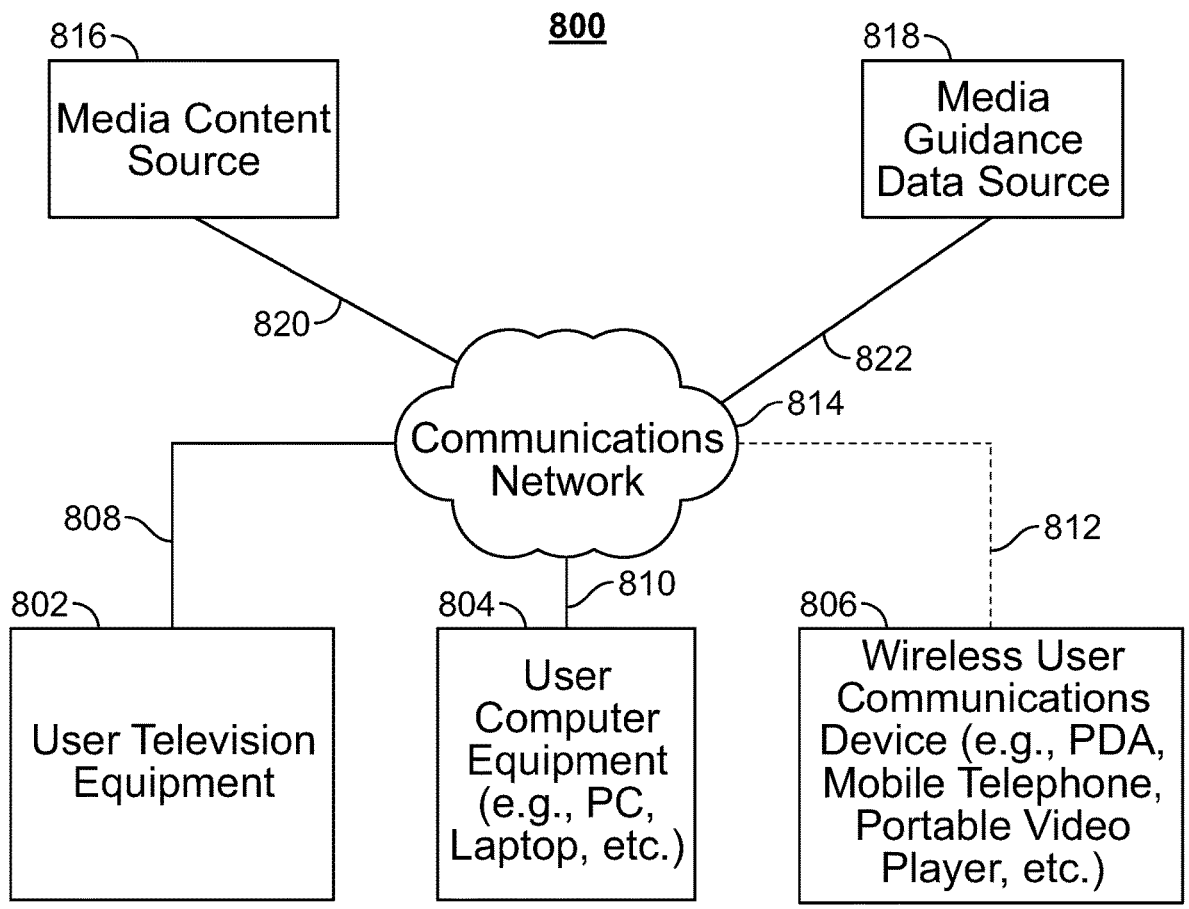
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communications paths, such as those described above in connection with paths 808, 810, and 812, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communications paths 820 and 822, respectively. Paths 820 and 822 may include any of the communications paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communications paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX™, and HULU, which provide audio and video via IP packets. Youtube is a trademark owned by Google Inc., Netflix™ is a trademark owned by Netflix™ Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 9:
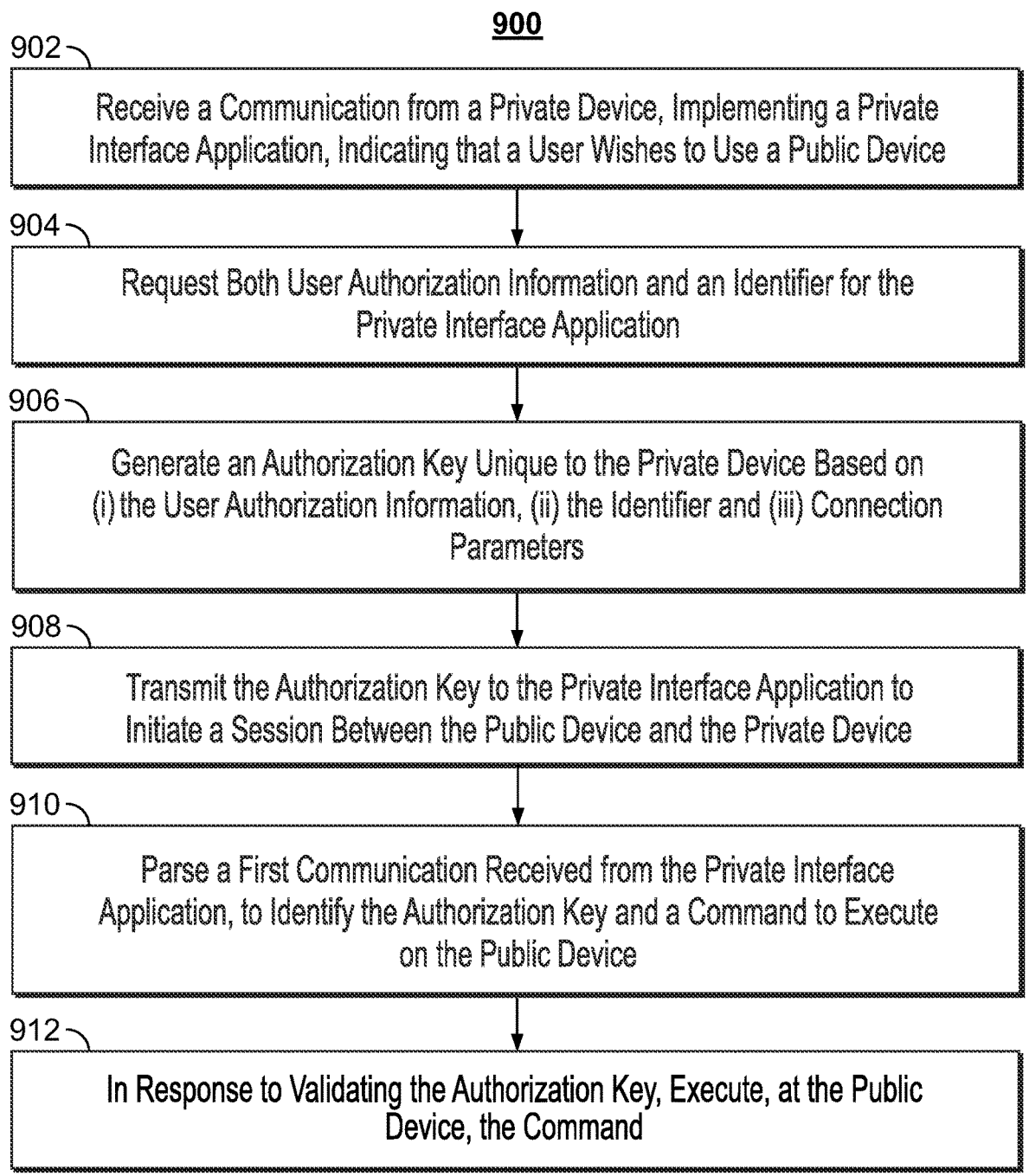
FIG. 9 is a flowchart of an illustrative process for connecting a public device to a private device in order to receive and execute a user command, in accordance with some embodiments of the disclosure.

FIG. 9 is a flowchart of an illustrative process for connecting a public device to a private device in order to receive and execute a user command, in accordance with some embodiments of the disclosure. It should be noted that process 900 or any step thereof could be performed on, or provided by, any of the devices shown in FIGS. 7-8. For example, process 900 may be executed by control circuitry 704 (FIG. 7) as instructed by a media guidance application implemented on a user device (e.g., user equipment devices 802, 804, and/or 806 (FIG. 8)). In addition, one or more steps of process 900 may be incorporated into or combined with one or more steps of any other process or embodiment (e.g., as described in relation to FIGS. 1-8 and 10-14).

At 902, control circuitry 704 receives a communication from a private device, implementing a private interface application, indicating that a user wishes to use a public device. The communication may be sent from the private device (e.g., user television equipment 802, user computer equipment 804, or wireless user communications device 806) via I/O Path 702 (e.g., communications path 808, 810, 812, respectively). Communications network 814 may be Internet-based, cellular network-based, Bluetooth-based, etc., and may send the communication to the public device (e.g., user television equipment 802, user computer equipment 804, or wireless user communications device 806). For example, the private device may be a wireless user communications device 806 and the public device may be user television equipment 802. Thus, the communication may be sent from communications path 812, over communications network 814, to communications path 808, in order to arrive at user television equipment 802.

At 904, control circuitry 704 requests both user authorization information and an identifier for the private interface application. The user authorization information may be retrieved from storage 708 of the private device. In some embodiments, the user authorization information may be retrieved from storage 708 of an external server/device. For example, the private device may request a remote user equipment device (e.g., a computer at the user's home) for the user authorization information. At 906, control circuitry 704 generates an authorization key unique to the private device based on (i) the user authorization information, (ii) the identifier and (iii) connection parameters. The generated authorization key may be stored in storage 708 of the public device. At 908, control circuitry 704 transmits the authorization key to the private interface application to initiate a session between the public device and the private device. Referring back to the example at 902, control circuitry 704 of the user television equipment (e.g., the public device) may transmit, to wireless user communications device 806 (e.g., the private device), the authorization key over communications network 814, via communications path 808 and communications path 812.

At 910, control circuitry 704 parses a first communication received from the private interface application, to identify the authorization key and a command to execute on the public device. For example, the user may enter, via user input interface 710, a command (e.g., a verbal input, text, gestures, biometric responses, etc.) at the private device. Control circuitry 704, at the private device, may generate a first communication that comprises the authorization key and the command (e.g., control circuitry 704 may retrieve the received authorization key from I/O Path 702 or storage 708. At 912, in response to validating the authorization key, control circuitry 704 executes, at the public device, the command. Suppose the command is to retrieve a public interface application that corresponds to the private interface application from media content source 816 and/or media guidance data source 818.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 9.

Figure 10:
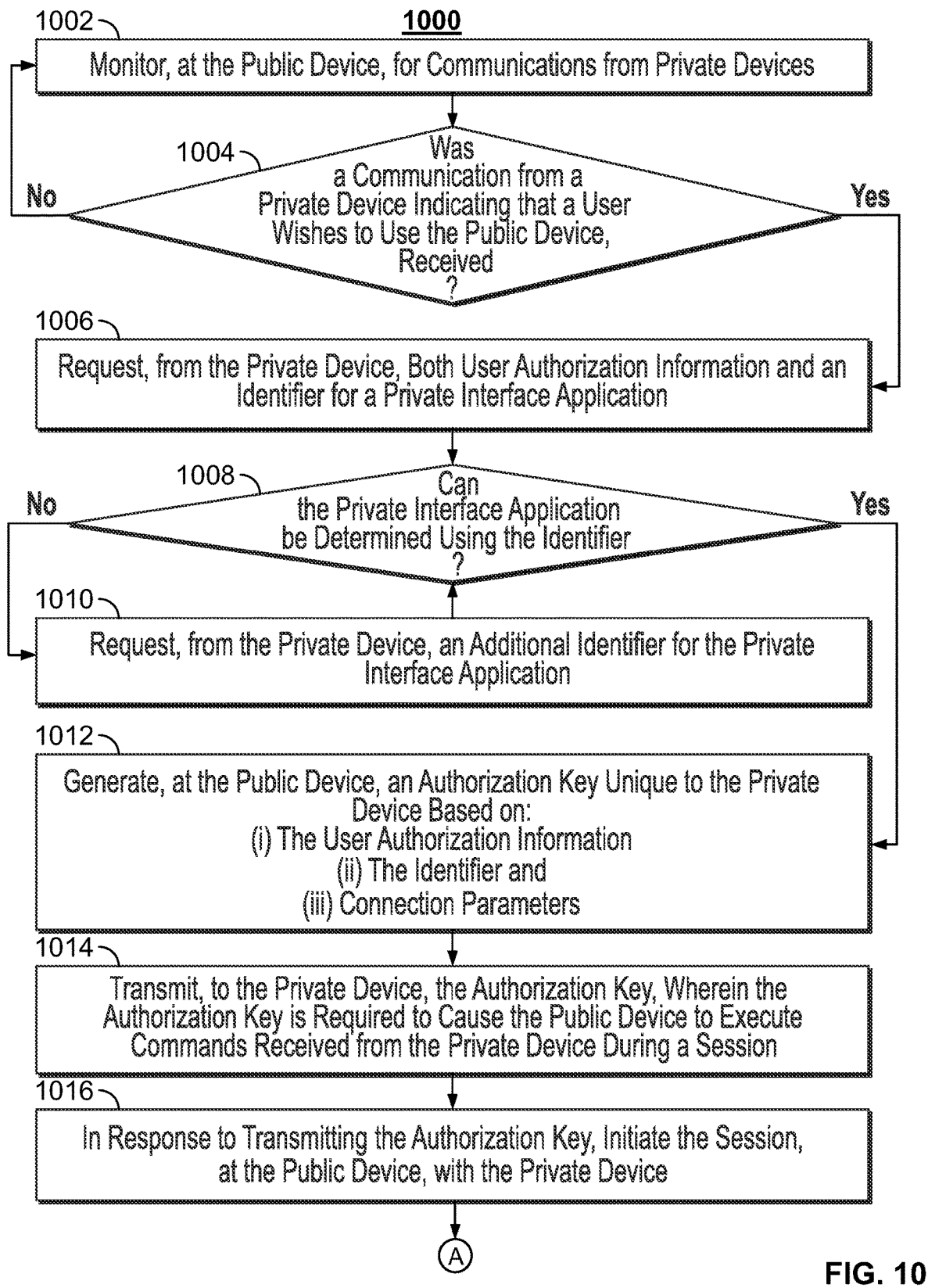
FIG. 10 is a flowchart of a detailed illustrative process for connecting a public device to a private device in order to receive and execute a user command, in accordance with some embodiments of the disclosure.
Figure 10:
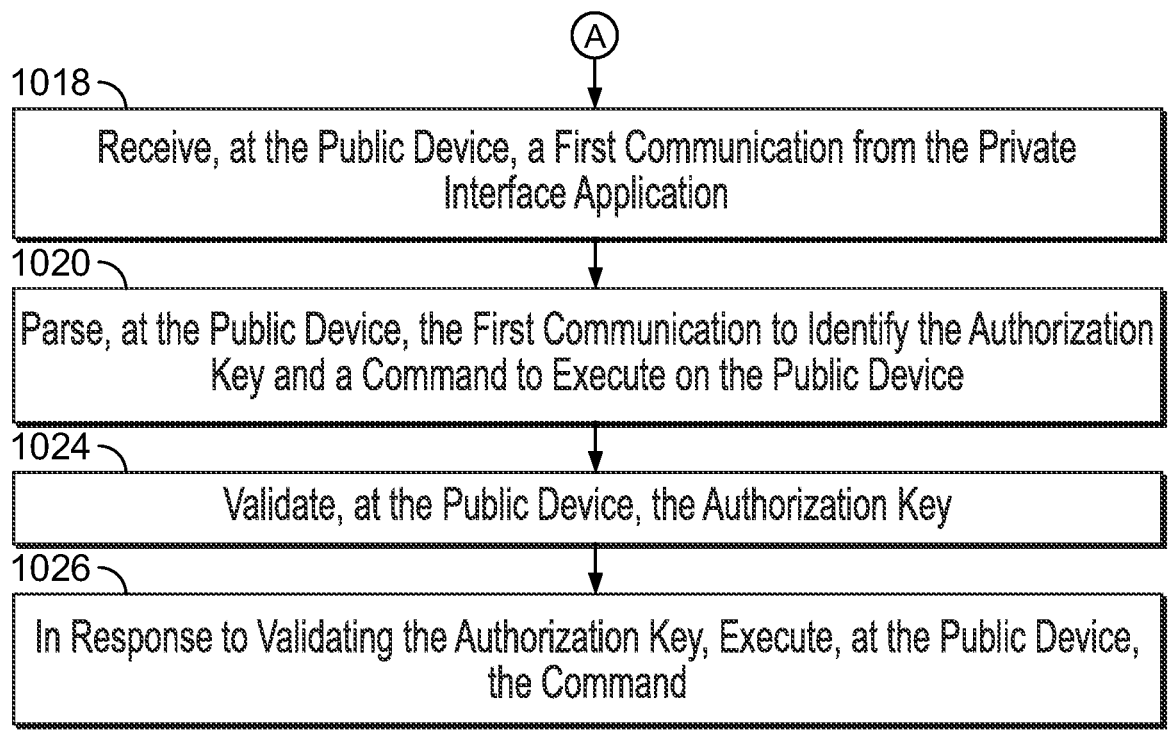

FIG. 10 is a flowchart of a detailed illustrative process for connecting a public device to a private device in order to receive and execute a user command, in accordance with some embodiments of the disclosure. It should be noted that process 1000 or any step thereof could be performed on, or provided by, any of the devices shown in FIGS. 7-8. For example, process 1000 may be executed by control circuitry 704 (FIG. 7) as instructed by a media guidance application implemented on a user device (e.g., user equipment devices 802, 804, and/or 806 (FIG. 8)). In addition, one or more steps of process 1000 may be incorporated into or combined with one or more steps of any other process or embodiment (e.g., as described in relation to FIGS. 1-9 and 11-14).

At 1002, control circuitry 704 monitors, at the public device, for communications from private devices. For example, the public device may be user television equipment 802, user computer equipment 804, or wireless user communications device 806. Accordingly, the public device may anticipate communications from the communications network 814 through communications paths 808, 810 and 812, respectively.

At 1004, control circuitry 704 determines whether a communication from a private device indicating that a user wishes to use the public device was received. Suppose that the public device is user television equipment 802 and the private device is user computer equipment 804. A private device may send a communication indicating that the user wishes to connect to the public device, from communications path 810, over communications network 814, to communications path 808, in order to reach the public device.

At 1006, in response to determining that a communication was received, control circuitry 704 requests, from the private device, both user authorization information and an identifier for the private interface application. The user authorization information and the identifier may be retrieved by control circuitry 704 from storage 708. In response to determining that a communication was not received, the process returns to 1002. For example, control circuitry 704 may continue to monitor for communications at the public device.

At 1008, control circuitry 704 determines whether the private device can be identified using the identifier. For example, control circuitry 704 may refer to a content provider database that is in storage 708 of the public device. The content provider database may list content providers and their associated identifiers (e.g., name, logo, user interface screenshots of associated applications), and may derive its information from the media guidance data source 818. Accordingly, control circuitry 704 may perform a lookup of the identifier in the content provider database. At 1010, in response to determining that the private interface application cannot be determined, control circuitry 704 requests, from the private device, an additional identifier for the private interface application. The additional identifier will ideally be different from the first identifier provided by the private device and the process returns to 1008.

At 1012, in response to identifying the private interface application from the identifier, control circuitry 704 generates, at the public device, an authorization key unique to the private device based on: (i) the user authorization information (ii) the identifier and (iii) connection parameters. The generated authorization key may be stored in storage 708 of the public device. At 1014, control circuitry 704 transmits (e.g., over communications network 814), to the private device, the authorization key, wherein the authorization key is required to cause the public device to execute commands received from the private device during a session.

At 1016, in response to transmitting the authorization key, control circuitry 704 initiates the session, at the public device, with the private device. The session represents a time period in which the private device is authorized to transmit commands to the public device and access content using the public device. For example, before the session is created, control circuitry 704 of the private device may not be able to access media content source 816 via the public device; in addition, if a command is included in the transmitted data packets, the public device may ignore the command in the absence of a session.

At 1018, control circuitry 704 receives (e.g., via I/O Path 702), at the public device, a first communication from the private interface application. At 1020, control circuitry 704 parses, at the public device, the first communication to identify the authorization key and a command to execute on the public device. For example, the communication may be sent as data packets. The payload of the data packet may include information about the authorization key and the command. The payload may include a header (e.g., different from the header of a packet) that indicates whether the payload contains the authorization key or the command. Thus, in the parsing process, control circuitry 704 may refer to the payload header to identify the authorization key and the command.

At 1024, control circuitry 704 validates, at the public device, the authorization key. At 1026, in response to validating the authorization key, control circuitry 704 executes, at the public device, the command. For example, control circuitry 704 may determine that the received authorization key from the first communication matches the transmitted authorization key from 1014. In the event that the respective authorization keys do not match, control circuitry 704 may end the session. In response to determining that the authorization key is validated, control circuitry 704 may determine whether the command is executable at the public device. For example, if the public device is a smart speaker and the command is to generate an image for display, control circuitry 704 may determine that the command is not executable. Specifically, control circuitry 704 may retrieve an executable command database from storage 708. The executable command database may include a plurality of commands that control circuitry 704 can execute. Thus, control circuitry 704 may determine whether the user's command from the first communication corresponds to a command in the executable command database. For example, the user's command may be a verbal statement such as "play the movie 'The Prestige' on Netflix™." Thus, control circuitry 704 may refer to the executable command database to determine if the function "play the movie" is included in the database. In response to determining that the function "play the [type of video]" is present in the executable command database, control circuitry 704 may determine that the term "Netflix™" refers to a public interface application. Accordingly, control circuitry 704 may retrieve the public interface application from the content provider Netflix™ (e.g., media content source 816). Next, control circuitry 704 may determine whether the media asset "The Prestige" is provided by Netflix™. If control circuitry 704 determines that the media asset is accessible (e.g., provided by Netflix™), control circuitry 704 may determine whether the user is authorized to access Netflix™ (e.g., based on the user authorization information). In response to determining that all parts of the command are executable, control circuitry 704 may execute the command. In response to determining that at least one of portion of the command cannot be executed, control circuitry 704 of the public device may generate an error message (e.g., via display 712 and/or speakers 714).

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 10.

Figure 11:
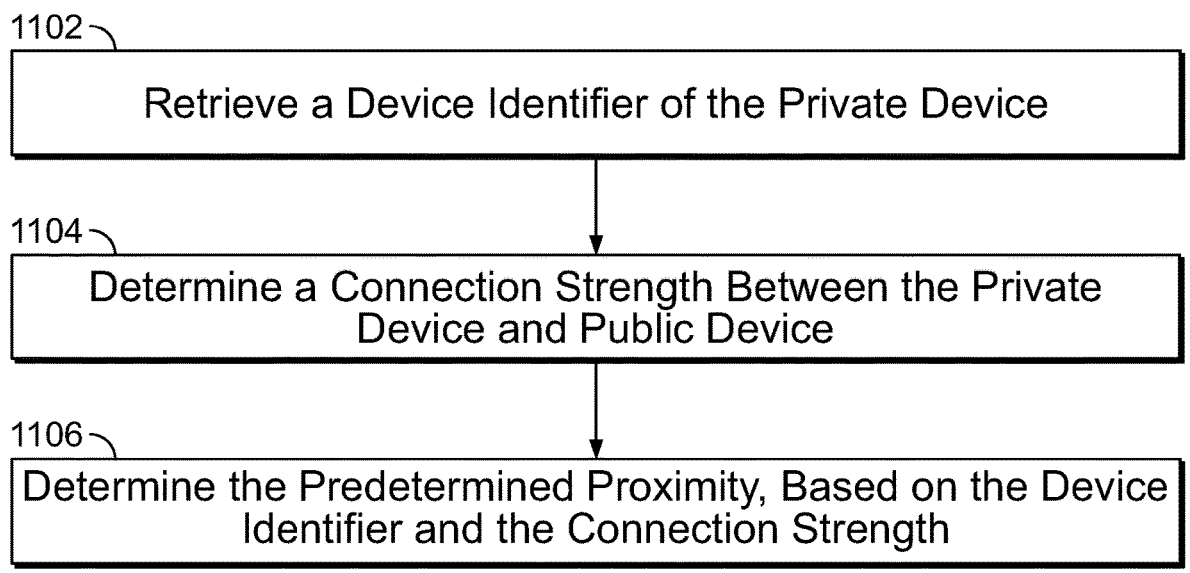
FIG. 11 is a flowchart of an illustrative process for determining the predetermined proximity, in accordance with some embodiments of the disclosure.

FIG. 11 is a flowchart of an illustrative process for determining the predetermined proximity, in accordance with some embodiments of the disclosure. It should be noted that process 1100 or any step thereof could be performed on, or provided by, any of the devices shown in FIGS. 7-8. For example, process 1100 may be executed by control circuitry 704 (FIG. 7) as instructed by a media guidance application implemented on a user device (e.g., user equipment devices 802, 804, and/or 806 (FIG. 8)). In addition, one or more steps of process 1100 may be incorporated into or combined with one or more steps of any other process or embodiment (e.g., as described in relation to FIGS. 1-10 and 12-14).

At 1102, control circuitry 704 retrieves a device identifier of the private device. For example, the device identifier may be retrieved from storage 708 of the private device. At 1104, control circuitry 704 determines a connection strength between the private device and the public device. The process of determining the connection strength is discussed in greater detail in the description of FIG. 12. At 1106, control circuitry 704 determines the predetermined proximity, based on the device identifier and the connection strength.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 11.

Figure 12:
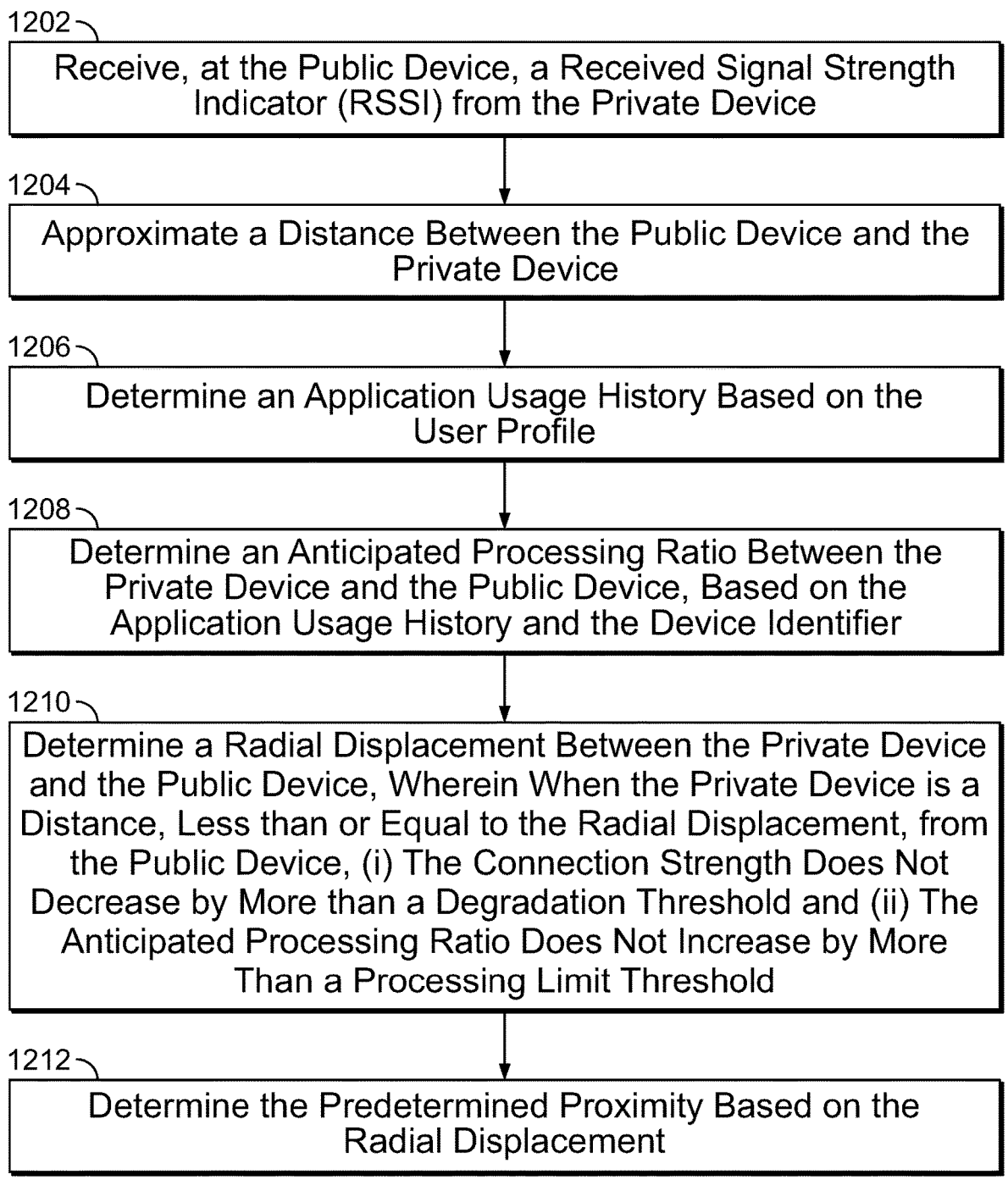
FIG. 12 is a flowchart of a detailed illustrative process for determining the predetermined proximity, in accordance with some embodiments of the disclosure.

FIG. 12 is a flowchart of a detailed illustrative process for determining the predetermined proximity, in accordance with some embodiments of the disclosure. It should be noted that process 1200 or any step thereof could be performed on, or provided by, any of the devices shown in FIGS. 7-8. For example, process 1200 may be executed by control circuitry 704 (FIG. 7) as instructed by a media guidance application implemented on a user device (e.g., user equipment devices 802, 804, and/or 806 (FIG. 8)). In addition, one or more steps of process 1200 may be incorporated into or combined with one or more steps of any other process or embodiment (e.g., as described in relation to FIGS. 1-11 and 13-14).

At 1202, control circuitry 704 receives, at the public device, a received signal strength indicator (RSSI) from the private device. Suppose that the private device is wireless user communications device 806 and the public device is user computer equipment 804. The RSSI may represent the signal strength over communications paths 812 and 810. At 1204, control circuitry 704 approximates a distance between the public device and the private device. For example, control circuitry 704 may retrieve a lookup table from storage 708 that converts RSSI values to distance. In some embodiments, control circuitry 704 may implement an algorithm that is a function of RSSI and returns distance.

At 1206, control circuitry 704 determines an application usage history based on a user profile. Control circuitry 704 may retrieve the user profile from storage 708 or media guidance data source 818 (e.g., if the latter tracks the user's application usage). At 1208, control circuitry 704 determines an anticipated processing ratio between the private device and the public device, based on the application usage history and the device identifier. At 1210, control circuitry 704 determines a radial displacement between the private device and the public device, wherein when the private device is a distance, less than or equal to the radial displacement, from the public device, (i) the connection strength does not decrease by more than a degradation threshold and (ii) the anticipated processing ratio does not increase by more than a processing limit threshold. Control circuitry 704 of the public device may retrieve the degradation threshold and/or the processing limit threshold from storage 708. At 1212, control circuitry 704 determines the predetermined proximity based on the radial displacement.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 12.

Figure 13:
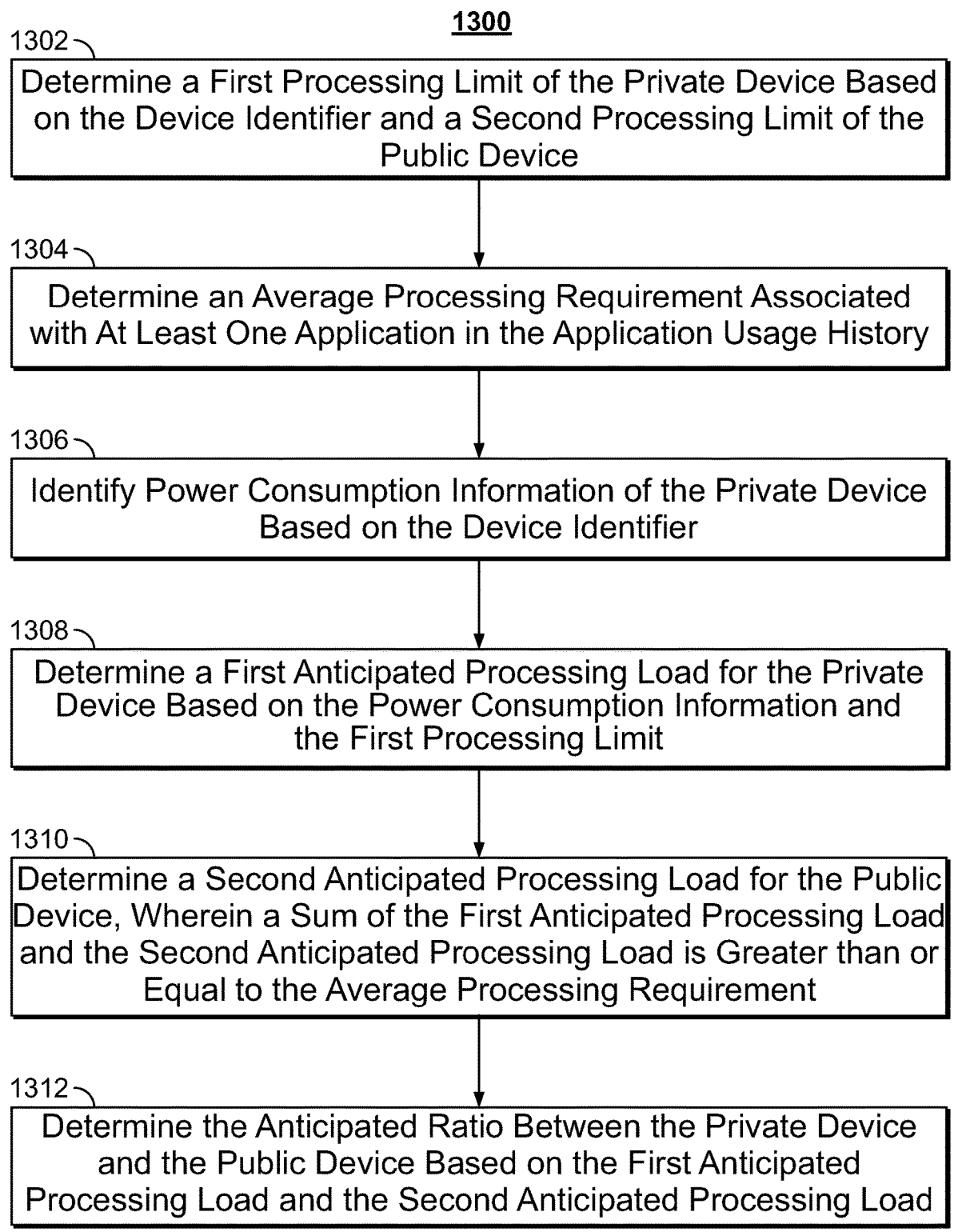
FIG. 13 is a flowchart of an illustrative process for determining an anticipated processing ratio, in accordance with some embodiments of the disclosure.

FIG. 13 is a flowchart of an illustrative process for determining an anticipated processing ratio, in accordance with some embodiments of the disclosure. It should be noted that process 1300 or any step thereof could be performed on, or provided by, any of the devices shown in FIGS. 7-8. For example, process 1300 may be executed by control circuitry 704 (FIG. 7) as instructed by a media guidance application implemented on a user device (e.g., user equipment devices 802, 804, and/or 806 (FIG. 8)). In addition, one or more steps of process 1300 may be incorporated into or combined with one or more steps of any other process or embodiment (e.g., as described in relation to FIGS. 1-12 and 14).

At 1302, control circuitry 704 determines a first processing limit of the private device based on the device identifier and a second processing limit of the public device. At 1304, control circuitry 704 determines an average processing requirement associated with at least one application in the application usage history. In some embodiments, control circuitry 704 may retrieve the average processing requirement from media guidance data source 818. For example, if the application is the Netflix™ mobile application, control circuitry 704 may refer to the metadata associated with the Netflix™ mobile application to determine the minimum requirements to run the application. The metadata may also list the maximum processing the Netflix™ mobile application may utilize. Accordingly, control circuitry 704 may determine the average of the minimum and maximum processing values to determine the average processing requirement.

At 1306, control circuitry 704 identifies power consumption information of the private device based on the device identifier. At 1308, control circuitry 704 determines a first anticipated processing load for the private device based on the power consumption information and the first processing limit. At 1310, control circuitry 704 determines a second anticipated processing load for the public device, wherein a sum of the first anticipated processing load and the second anticipated processing load is greater than or equal to the average processing requirement. The power consumption information and processing limit values may be retrieved from storage 708, by control circuitry 704. In some embodiments, control circuitry 704 of the private device and the public device may each monitor the processing and/or power consumption status of the respective devices. Thus, the processing limits and power consumption account for factors such as currently running applications (e.g., utilized RAM, power, processing, etc.), battery level, etc. At 1312, control circuitry 704 determines the anticipated processing ratio between the private device and the public device based on the first anticipated processing load and the second anticipated processing load.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 13.

Figure 14:
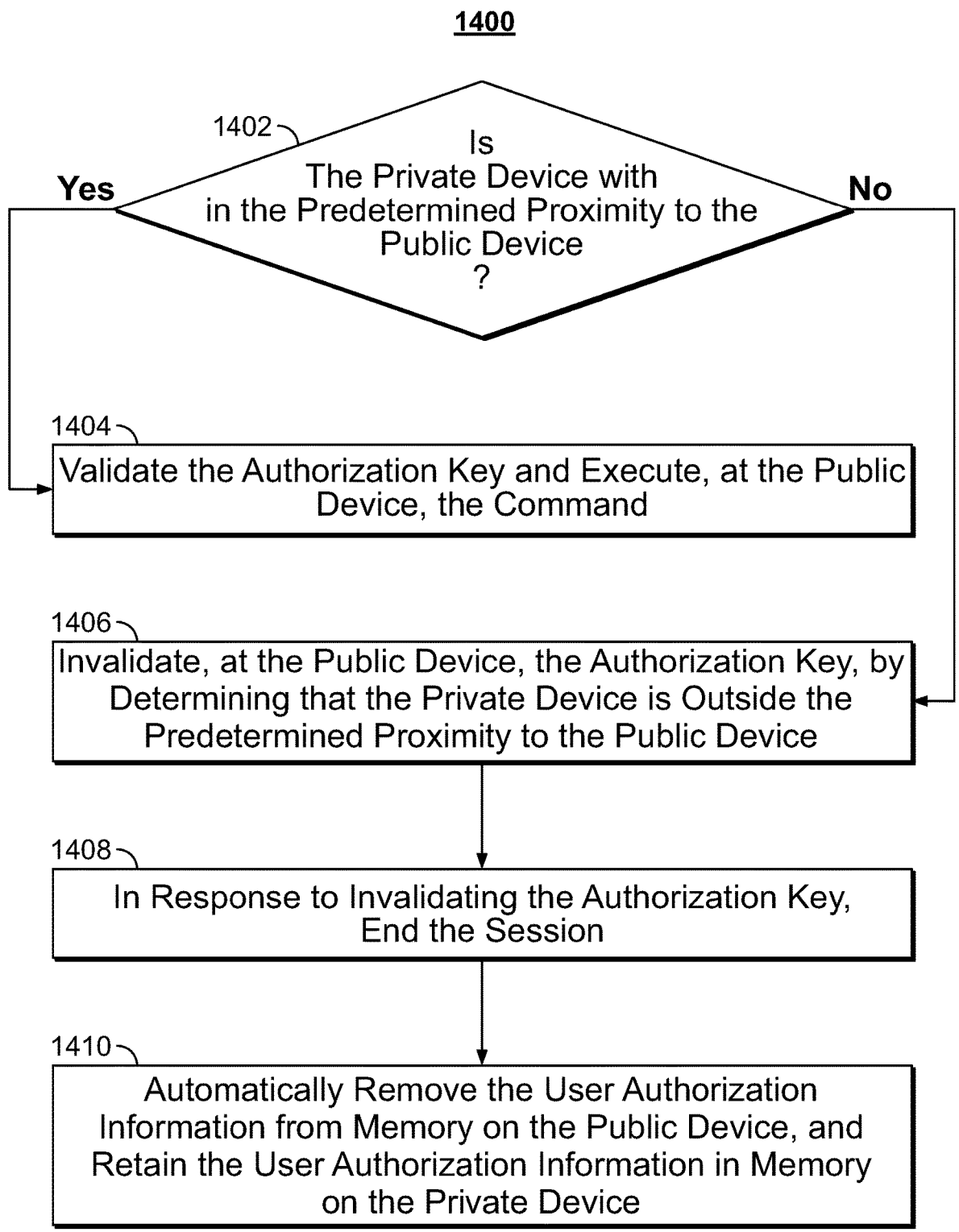
FIG. 14 is a flowchart of an illustrative process for invalidating the authorization key, in accordance with some embodiments of the disclosure.

FIG. 14 is a flowchart of an illustrative process for invalidating the authorization key, in accordance with some embodiments of the disclosure. It should be noted that process 1400 or any step thereof could be performed on, or provided by, any of the devices shown in FIGS. 7-8. For example, process 1400 may be executed by control circuitry 704 (FIG. 7) as instructed by a media guidance application implemented on a user device (e.g., user equipment devices 802, 804, and/or 806 (FIG. 8)). In addition, one or more steps of process 1400 may be incorporated into or combined with one or more steps of any other process or embodiment (e.g., as described in relation to FIGS. 1-13).

At 1402, control circuitry 704 determines whether the private device is within the predetermined proximity to the public device. The predetermined proximity may be retrieved, by control circuitry 704, from storage 708. At 1404, in response to determining that the private device is within the predetermined proximity to the public device, control circuitry 704 validates the authorization key and executes, at the public device, the command. At 1406, in response to determining that the private device is not within the predetermined proximity to the public device, control circuitry 704 invalidates, at the public device, the authorization key, by determining that the private device is outside the predetermined proximity to the public device. At 1408, in response to invalidating the authorization key, control circuitry 704 ends the session. At 1410, control circuitry 704 automatically removes the user authorization information from memory (e.g., storage 708) on the public device, and retains the user authorization information in memory on the private device.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 14.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for connecting public devices to private devices in order to receive and execute user commands, the method comprising:
   receiving a communication from a private device, implementing a private interface application, indicating that a user wishes to use a public device;
   requesting, from the private device, both user authorization information and an identifier for the private interface application, wherein the user authorization information comprises a user profile;
   generating, at the public device, an authorization key unique for the private device, wherein the authorization key is required to cause the public device to execute commands received from the private device during a session, by:
   determining an anticipated processing ratio based on an application usage history of the user profile and a device identifier of the private device;
   determining a radial displacement between the private device and the public device based on a connection strength between the private device and the public device and the anticipated processing ratio;

determining, based on the radial displacement, a predetermined proximity to the public device at which the private device must remain in order for the authorization key to remain valid; and generating the authorization key based on (i) the user authorization information, (ii) the identifier and (iii) connection parameters, wherein the connection parameters comprise the predetermined proximity;

transmitting, to the private device, the authorization key;

in response to transmitting the authorization key, initiating the session, at the public device, with the private device;

receiving, at the public device, a first communication from the private interface application;

parsing, at the public device, the first communication to identify the authorization key and a command to execute on the public device;

validating, at the public device, the authorization key; and in response to validating the authorization key, executing, at the public device, the command.

2. The method of claim 1, wherein generating, at the public device, the authorization key further comprises:

retrieving the device identifier of the private device;

determining the connection strength between the private device and the public device; and determining the predetermined proximity, further based on the device identifier.

3. The method of claim 2, wherein determining the predetermined proximity further comprises:

receiving, at the public device, a received signal strength indicator (RSSI) from the private device;

approximating, based on the RSSI, a distance between the public device and the private device; and determining an application usage history based on the user profile.

4. The method of claim 1, wherein determining the anticipated processing ratio between the private device and the public device further comprises:

determining a first processing limit of the private device based on the device identifier and a second processing limit of the public device;

determining an average processing requirement associated with at least one application in the application usage history;

identifying power consumption information of the private device based on the device identifier;

determining a first anticipated processing load for the private device based on the power consumption information and the first processing limit;

determining a second anticipated processing load for the public device, wherein a sum of the first anticipated processing load and the second anticipated processing load is greater than or equal to the average processing requirement; and determining the anticipated processing ratio between the private device and the public device based on the first anticipated processing load and the second anticipated processing load.

5. The method of claim 1, wherein receiving the communication from the private device is in response to receiving, at the private device, a broadcast message inviting the private device to access the public device.

6. The method of claim 5, wherein the broadcast message inviting the private device to access the public device is transmitted by the public device in response to determining that the private device is within a predetermined displacement to the public device.

7. The method of claim 1, wherein executing, at the public device, the command further comprises:

verifying that the private device is within the predetermined proximity to the public device; and in response to validating the authorization key and verifying that the private device is within the predetermined proximity to the public device, executing, at the public device, the command.

8. The method of claim 7, further comprising:

invalidating, at the public device, the authorization key, by determining that the private device is outside the predetermined proximity to the public device; and in response to invalidating the authorization key, ending the session.

9. The method of claim 8, wherein the public device is configured, upon ending the session, to automatically remove the user authorization information from memory, and wherein the private interface application is configured, upon ending the session, to retain the user authorization information in memory on the private device.

10. The method of claim 1, wherein the user authorization information is a universally unique identifier (UUID) or globally unique identifier (GUID) generated by the private interface application in response to verifying a login name and password entered into the private interface application, and wherein the user authorization information is valid for a predetermined time after verifying the login name and password.

11. A system for connecting public devices to private devices in order to receive and execute user commands, the system comprising:

control circuitry configured to:

receive a communication from a private device, implementing a private interface application, indicating that a user wishes to use a public device;

request, from the private device, both user authorization information and an identifier for the private interface application, wherein the user authorization information comprises a user profile;

generate, at the public device, an authorization key unique for the private device based, wherein the authorization key is required to cause the public device to execute commands received from the private device during a session, by:

determining an anticipated processing ratio based on an application usage history of the user profile and a device identifier of the private device;

determining a radial displacement between the private device and the public device based on a connection strength between the private device and the public device and the anticipated processing ratio;

determining, based on the radial displacement, a predetermined proximity to the public device at which the private device must remain in order for the authorization key to remain value; and generating the authorization key based on (i) the user authorization information, (ii) the identifier and (iii) connection parameters, wherein the connection parameters comprise the predetermined proximity;

transmit, to the private device, the authorization key;

in response to transmitting the authorization key, initiate the session, at the public device, with the private device;

receive, at the public device, a first communication from the private interface application;

parse, at the public device, the first communication to identify the authorization key and a command to execute on the public device;

validate, at the public device, the authorization key; and in response to validating the authorization key, execute, at the public device, the command.

12. The system of claim 11, wherein the control circuitry, when generating, at the public device, the authorization key, is further configured to:

retrieve the device identifier of the private device;

determine the connection strength between the private device and the public device; and determine the predetermined proximity, further based on the device identifier and the connection strength.

13. The system of claim 12, wherein the control circuitry, when determining the predetermined proximity, is further configured to:

receive, at the public device, a received signal strength indicator (RSSI) from the private device;

approximate, based on the RSSI, a distance between the public device and the private device; and determine an application usage history based on the user profile.

14. The system of claim 11, wherein the control circuitry, when determining the anticipated processing ratio between the private device and the public device, is further configured to:

determine a first processing limit of the private device based on the device identifier and a second processing limit of the public device;

determine an average processing requirement associated with at least one application in the application usage history;

identify power consumption information of the private device based on the device identifier;

determine a first anticipated processing load for the private device based on the power consumption information and the first processing limit;

determine a second anticipated processing load for the public device, wherein a sum of the first anticipated processing load and the second anticipated processing load is greater than or equal to the average processing requirement; and determine the anticipated processing ratio between the private device and the public device based on the first anticipated processing load and the second anticipated processing load.

15. The system of claim 11, wherein the communication from the private device is in response to receiving, at the private device, a broadcast message inviting the private device to access the public device.

16. The system of claim 15, wherein the broadcast message inviting the private device to access the public device is transmitted by the public device in response to determining that the private device is within a predetermined displacement to the public device.

17. The system of claim 11, wherein the control circuitry, when executing, at the public device, the command, is further configured to:

verify that the private device is within the predetermined proximity to the public device; and in response to validating the authorization key and verifying that the private device is within the predetermined proximity to the public device, execute, at the public device, the command.

18. The system of claim 17, wherein the control circuitry is further configured to:

invalidate, at the public device, the authorization key, by determining that the private device is outside the predetermined proximity to the public device; and in response to invalidating the authorization key, end the session.

19. The system of claim 18, wherein the public device is configured, upon ending the session, to automatically remove the user authorization information from memory, and wherein the private interface application is configured, upon ending the session, to retain the user authorization information in memory on the private device.

20. The system of claim 11, wherein the user authorization information is a universally unique identifier (UUID) or globally unique identifier (GUID) generated by the private interface application in response to verifying a login name and password entered into the private interface application, and wherein the user authorization information is valid for a predetermined time after verifying the login name and password.

* * * * *